(12) United States Patent
Yang et al.

(10) Patent No.: US 11,265,616 B2
(45) Date of Patent: *Mar. 1, 2022

(54) DEVICE AND METHOD FOR TRANSMITTING MEDIA DATA ACROSS MULTIPLE FREQUENCY BANDS

(71) Applicant: SAMSUNG ELECTRONICS CO., LTD., Suwon-si (KR)

(72) Inventors: Hyun-koo Yang, Seoul (KR); Young-ho Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,155

(22) Filed: Feb. 3, 2021

(65) Prior Publication Data
US 2021/0266645 A1 Aug. 26, 2021

Related U.S. Application Data

(63) Continuation of application No. 16/326,967, filed as application No. PCT/KR2017/010070 on Sep. 13, 2017, now Pat. No. 10,939,180.

(Continued)

(51) Int. Cl.
*G06F 15/16* (2006.01)
*H04N 21/643* (2011.01)
(Continued)

(52) U.S. Cl.
CPC ... *H04N 21/64322* (2013.01); *H04L 65/4076* (2013.01); *H04L 65/4084* (2013.01);
(Continued)

(58) Field of Classification Search
CPC ......... H04N 21/64322; H04N 21/6332; H04N 21/4263; H04N 21/4345; H04N 21/23605;
(Continued)

(56) References Cited

U.S. PATENT DOCUMENTS

| 8,798,033 B2 | 8/2014 | Kim et al. |
| 9,686,111 B2 | 6/2017 | Kim et al. |

(Continued)

FOREIGN PATENT DOCUMENTS

| CN | 101558589 A | 10/2009 |
| CN | 104883606 A | 9/2015 |

(Continued)

OTHER PUBLICATIONS

Communication dated Aug. 27, 2019, issued by the European Patent Office in counterpart European Application No. 17851127.5.

(Continued)

*Primary Examiner* — Johnny B Aguiar
(74) *Attorney, Agent, or Firm* — Sughrue Mion, PLLC

(57) ABSTRACT

A transmission device is disclosed. The transmission device comprises a signal generation unit for generating a broadcast signal including a service, and a transmission unit for transmitting the broadcast signal through at least one radio frequency (RF) channel. A broadcast stream transmitted through the RF channel includes signaling for the service, the signaling for the service including information indicating whether the service is transmitted through a plurality of RF channels, and information indicating whether the broadcast stream transmitted through the RF channel contains an essential portion of the service.

11 Claims, 8 Drawing Sheets

Related U.S. Application Data

(60) Provisional application No. 62/409,968, filed on Oct. 19, 2016, provisional application No. 62/393,807, filed on Sep. 13, 2016.

(51) Int. Cl.
| | | |
|---|---|---|
| *H04N 21/2362* | (2011.01) | |
| *H04N 21/2385* | (2011.01) | |
| *H04N 21/6332* | (2011.01) | |
| *H04N 21/426* | (2011.01) | |
| *H04N 21/434* | (2011.01) | |
| *H04L 65/611* | (2022.01) | |
| *H04L 65/612* | (2022.01) | |
| *H04N 21/236* | (2011.01) | |

(52) U.S. Cl.
CPC ..... *H04N 21/2362* (2013.01); *H04N 21/2385* (2013.01); *H04N 21/23605* (2013.01); *H04N 21/4263* (2013.01); *H04N 21/4345* (2013.01); *H04N 21/6332* (2013.01)

(58) Field of Classification Search
CPC ........... H04N 21/2362; H04N 21/2385; H04N 21/44227; H04L 65/4076; H04L 65/4084
USPC .................................. 709/217, 219, 231, 238
See application file for complete search history.

(56) References Cited

U.S. PATENT DOCUMENTS

| | | | |
|---|---|---|---|
| 9,722,840 B2 | 8/2017 | Kim et al. | |
| 9,923,743 B2 | 3/2018 | Kim et al. | |
| 10,142,146 B2 | 11/2018 | Kim et al. | |
| 10,193,725 B2 | 1/2019 | Kim et al. | |
| 10,454,731 B2 | 10/2019 | Kim et al. | |
| 10,645,674 B2 | 5/2020 | Kwak et al. | |
| 2001/0034872 A1 | 10/2001 | Smallcomb | |
| 2005/0020238 A1 | 1/2005 | Eastman | |
| 2005/0099938 A1 | 5/2005 | Sarraf et al. | |
| 2006/0030279 A1 | 2/2006 | Leabman | |
| 2011/0154425 A1* | 6/2011 | Kim | H04N 21/631 725/116 |
| 2011/0264530 A1* | 10/2011 | Santangelo | H04L 65/4076 705/14.64 |
| 2012/0005715 A1* | 1/2012 | Lee | H04N 21/23895 725/118 |
| 2012/0054811 A1* | 3/2012 | Spears | H04N 21/4316 725/106 |
| 2013/0222540 A1* | 8/2013 | Tajima | H04N 13/341 348/43 |
| 2014/0218474 A1* | 8/2014 | Hong | H04N 21/234327 348/43 |
| 2014/0282729 A1* | 9/2014 | Stern | H04N 21/8455 725/40 |
| 2015/0244964 A1 | 8/2015 | Kim et al. | |
| 2016/0226688 A1 | 8/2016 | Kim et al. | |
| 2016/0226689 A1 | 8/2016 | Kim et al. | |
| 2016/0277545 A1 | 9/2016 | Kwak et al. | |
| 2016/0295553 A1 | 10/2016 | Kwak et al. | |
| 2017/0237593 A1 | 8/2017 | Kim et al. | |
| 2017/0272691 A1 | 9/2017 | Song et al. | |
| 2017/0310518 A1 | 10/2017 | Kim et al. | |
| 2018/0098111 A1 | 4/2018 | Yang et al. | |
| 2018/0167245 A1 | 6/2018 | Kim et al. | |
| 2019/0052498 A1 | 2/2019 | Kim et al. | |
| 2020/0044901 A1 | 2/2020 | Kim et al. | |
| 2020/0229138 A1 | 7/2020 | Kwak et al. | |

FOREIGN PATENT DOCUMENTS

| | | |
|---|---|---|
| CN | 105830372 A | 8/2016 |
| KR | 10-2008-0076359 A | 8/2008 |
| KR | 10-2011-0026205 A | 3/2011 |
| KR | 10-2016-0123942 A | 10/2016 |
| WO | 2008/100046 A1 | 8/2008 |
| WO | 2016/105090 A1 | 6/2016 |
| WO | 2016/125991 A1 | 8/2016 |

OTHER PUBLICATIONS

Communication dated Jul. 16, 2020 issued by the Indian Patent Office in Indian counterpart Application No. 201917008068.
Communication dated Dec. 9, 2019 issued by the Korean Intellectual Property Office in counterpart Korean Application No. 10-2018-7035047.
Written Opinion (PCT/ISA/237) dated Jan. 30, 2018 issued by the International Searching Authority in International Application No. PCT/KR2017/010070.
Communication dated Jul. 6, 2020 issued by the Korean Intellectual Property Office in counterpart Korean Application No. 10-2018-7035047.
"ATSC Proposed Standard: Signaling, Delivery, Synchronization, and Error Protection (A/331)", Doc S33-174r7, May 4, 2017, pp. 1-190, 201 pages total.
International Search Report (PCT/ISA/210) dated Jan. 30, 2018 issued by the International Searching Authority in International Application No. PCT/KR2017/010070.
Communication dated May 6, 2020 issued by the Korean Intellectual Property Office in counterpart Korean Application No. 10-2018-7035047.
Communication dated Sep. 18, 2020, from the State Intellectual Property Office of People's Republic of China in counterpart Application No. 201780056400.6.
Communication dated Oct. 21, 2021 by the European Patent Office in European Patent Application No. 17851127.5.

* cited by examiner

DEVICE AND METHOD FOR TRANSMITTING MEDIA DATA ACROSS MULTIPLE FREQUENCY BANDS

CROSS REFERENCE TO RELATED APPLICATION

This application is a Continuation Application of U.S. application Ser. No. 16/326,967, filed on Feb. 21, 2019, which is a National Stage Entry of PCT/KR2017/010070, filed on Sep. 13, 2017, which claims Priority from Provisional Application No. 62/409,968, filed on Oct. 19, 2016 and claims Priority from Provisional Application No. 62/393,807, filed on Sep. 13, 2016, the disclosures of which are incorporated by reference in their entireties.

TECHNICAL FIELD

The disclosure relates to a transmission device and a transmission method therefor, and more particularly, to a transmission device which transmits a broadcast stream by using one or more frequency bands, and a transmission method therefor.

BACKGROUND ART

In the information-oriented society of the 21st century, broadcast communication services are facing the era of digitalization, multi-channel, wideband, and high quality. In particular, as high-definition digital television (TVs) and portable multimedia players (PMPs, hereinafter, referred to as "PMP"), and portable broadcasting devices are increasingly used in recent years, digital broadcasting services are increasingly required to support various reception methods. In addition, there are increasing demands not only for a traditional linear service including one image signal and one sound signal via a broadcasting network, but also for a heterogeneous network-based personal service providing services including various images/sounds/texts via a broadcasting network and Internet, and selectively receiving elements according to user's tastes at a receiver and providing the elements.

Moving picture experts group (MPEG) 2-transport stream (TS) used in an existing digital broadcasting system shows optimal performance when all components necessary for a service are multiplexed into a single packet stream. However, in an environment where respective service components are transmitted through different MPEG2-TS streams or a heterogeneous network, the efficiency of a system is noticeably reduced. Accordingly, a demand for a broadcasting system using a transmission protocol based on an Internet protocol is increasing, and the Association of Radio Industries and Businesses (ARIB) satellite broadcasting standards of Japan, the Advanced Television Systems Committee (ATSC) 3.0 standards of the United States (U.S.), or the ultra-high definition (UHD) television (UHDTV) standards of Korea employ the Internet Protocol (IP)-based MPEG (Moving Picture Experts Group) Media Transport (MMT) (ISO/IEC 23008-1 MPEG Media Transport) Protocol as broadcast standards technology.

A current digital broadcasting system is designed on the assumption that all elements forming one service are transmitted in one broadcast frequency band, and although there is a receiver processing a plurality of frequency bands simultaneously, this receiver is used for the purpose of providing a plurality of services rather than one service, simultaneously, by overlapping the same on the screen. When one service is transmitted through a plurality of frequency bands, it is possible to provide more services within limited frequency resources due to an increasing statistical multiplexing gain, and the frequency resources can be more efficiently used to, for example, allow the plurality of services to have common elements. However, the receiver may require a device for obtaining broadcast signals transmitted through the plurality of frequencies, simultaneously, and user's random access performance may be degraded. Therefore, there is a demand for a method for utilizing a plurality of frequency bands efficiently in a digital broadcasting system.

DETAILED DESCRIPTION OF THE DISCLOSURE

Technical Objects

The disclosure has been developed in order to solve the above-mentioned problems, and an object of the disclosure is to provide a transmission device which includes information regarding a frequency band for transmitting a service in a broadcast stream corresponding to each frequency band, and transmits the information, and a transmission method therefor.

Technical Solving Method

According to an embodiment of the disclosure to achieve the above-described object, a transmission device includes: a signal generator configured to generate a broadcast signal comprising a service; and a transmitter configured to transmit the broadcast signal through at least one radio frequency (RF) channel, wherein a broadcast stream transmitted through the RF channel comprises signaling for the service, wherein the signaling for the service comprises information indicating whether the service is transmitted through a plurality of RF channels, and information indicating whether the broadcast stream transmitted through the RF channel comprises an essential portion of the service.

In this case, when the signaling for the service includes a first attribute, the signaling may indicate that the service is transmitted through the plurality of RF channels.

In addition, when an attribute value of the first attribute is a first value, the attribute value may indicate that the broadcast stream comprises an essential portion of the service.

In addition, when the attribute value of the first attribute is a second value, the attribute value may indicate that the broadcast stream comprises a non-essential portion of the service.

In addition, the first attribute may be a Boolean attribute, and the first value may be "true" and the second value may be "false."

In addition, when the attribute value of the first attribute is the first value, the signaling for the service may further include information regarding an identifier of a broadcast stream transmitting a non-essential portion of the service.

In addition, the signaling for the service may further include information indicating whether the broadcast stream transmits a duplicate or a portion of the service.

The signaling for the service may be a service list table (SLT).

According to an embodiment of the disclosure, a transmission method includes: generating a broadcast signal comprising a service; and transmitting the broadcast signal through at least one RF channel, wherein a broadcast stream transmitted through the RF channel comprises signaling for the service, wherein the signaling for the service comprises information indicating whether the service is transmitted through a plurality of RF channels, and information indicating whether the broadcast stream transmitted through the RF channel comprises an essential portion of the service.

In this case, when the signaling for the service comprises a first attribute, the signaling may indicate that the service is transmitted through the plurality of RF channels.

In addition, when an attribute value of the first attribute is a first value, the attribute value may indicate that the broadcast stream comprises an essential portion of the service.

In addition, when the attribute value of the first attribute is a second value, the attribute value may indicate that the broadcast stream comprises a non-essential portion of the service.

Herein, the first attribute may be a Boolean attribute, and the first value may be "true" and the second value may be "false."

In addition, when the attribute value of the first attribute is the first value, the signaling for the service may further include information regarding an identifier of a broadcast stream transmitting a non-essential portion of the service.

In addition, the signaling for the service may further include information indicating whether the broadcast stream transmits a duplicate or a portion of the service.

Herein, the signaling for the service may be a service list table (SLT).

Advantageous Effect

According to various embodiments of the disclosure as described above, a plurality of frequency bands can be efficiently utilized in a digital broadcasting system.

BEST MODE FOR EMBODYING THE INVENTION

Mode for Embodying the Invention

Figure 1:
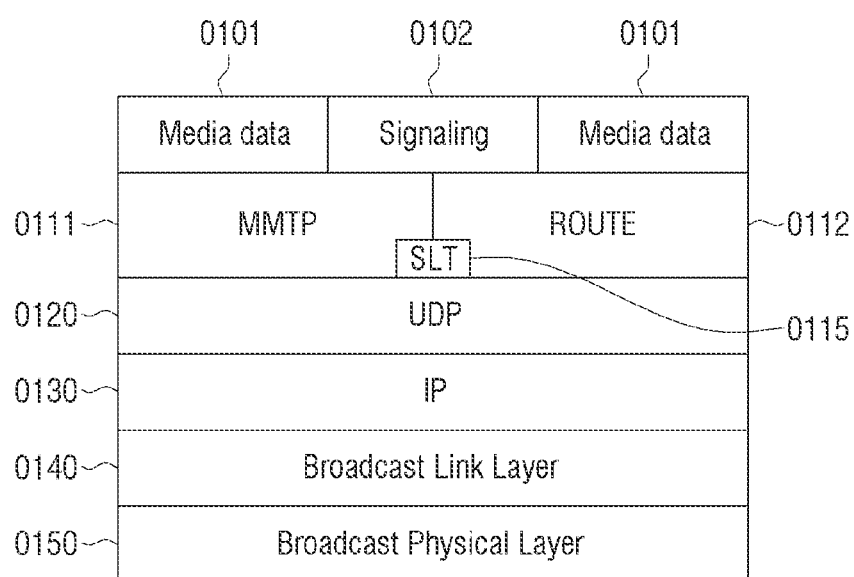
FIG. 1 is a view to illustrate a schematic configuration of a transmission system according to an embodiment of the disclosure.

The following detailed descriptions made with reference to the accompanying drawings will assist in comprehensively understanding various embodiments of the disclosure defined by the claims and equivalents to the claims. The following detailed descriptions include various specific matters for understanding of the disclosure, but these matters will be regarded as a simple example. Accordingly, a person skilled in the art will recognize that various changes and modifications to various embodiments described herein can be made without departing from the scope and the idea of the disclosure. In addition, well-known functions or components will not be explained for the sake of clarity and brevity.

The terms and words used in the detailed descriptions and the claims are not limited to literary meanings, and are just used for inventors to clearly and consistently understand the disclosure. Accordingly, it will be obvious to a person skilled in the art that the detailed descriptions of various embodiments of the disclosure are just provided for the illustrative purpose, and are not provided to limit the disclosure defined by the appended claims and equivalents to the claims.

As used herein, the singular forms such as "one" and "said" used in the detailed descriptions are intended to include the plural forms as well, unless the context clearly indicates otherwise. Accordingly, for example, "component surface" includes one or more component expressions.

The terms such as "first" and "second" used in embodiments may be used to explain various elements, and the elements should not be limited by these terms. These terms may be used only for the purpose of distinguishing one element from another element. For example, a first element may be named a second element without departing from the scope of right of the disclosure, and similarly, a second element may be named a first element. The term "and/or" includes a combination of a plurality of related items or any one of the plurality of related items.

The terms used in the detailed descriptions are just for the purpose of describing particular exemplary embodiments and are not intended to limit the disclosure. As used herein, the singular forms used in embodiments of the disclosure are intended to include the plural forms as well, unless the context clearly indicates otherwise. The term "include" or "have" used in the detailed descriptions indicates the presence of features, numbers, steps, operations, elements, and components described in the specification, or a combination thereof, and do not preclude the presence or addition of one or more other features, numbers, steps, operations, elements, or components, or a combination thereof.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology.

According to various embodiments of the disclosure, an electronic device may include a communication function. For example, the electronic device may be a smartphone, a tablet personal computer (PC, hereinafter, referred to as "PC"), a mobile phone, a video telephone, an electronic book reader, a desktop PC, a laptop PC, a netbook PC, a personal digital assistant (PDA, hereinafter, referred to as "PDA"), a portable multimedia player (PMP, hereinafter, referred to as "PMP"), an MP3 player, a mobile medical device, a camera, a wearable device (for example, a head-mounted device (HMD, hereinafter, referred to as "HMD"), fabric clothing, an electronic bracelet, an electronic necklace, an appcessory, electronic tattoos, a smart watch, or the like.

According to various embodiments of the disclosure, the electronic device may be a smart home appliance having a communication function. For example, the smart home appliance may be a television (TV), a digital video disk (DVD, hereinafter, referred to as "DVD") player, an audio, a refrigerator, an air conditioner, a vacuum cleaner, an oven, a microwave oven, a washer, a drier, an air cleaner, a set-top box, a TV box (for example, Samsung HomeSync™, Apple TV™, or Google TV™), a game console, ab electronic dictionary, a camcorder, or an electronic picture frame, or the like.

According to various embodiments of the disclosure, the electronic device may be a medical device (for example, a magnetic resonance angiography (MRA, hereinafter, referred to as "MRA") device, a magnetic resonance imaging (MRI, hereinafter, referred to as "MRI"), a computed tomography (CT, hereinafter, referred to as "CT") device, a scanner, and an ultrasonic device), a navigation device, a global positioning system (GPS, hereinafter, referred to as "GPS") receiver, an event data recorder (EDR, hereinafter, referred to as "EDR"), a flight data recorder (FDR, hereinafter, referred to as "FDR"), an automotive infotainment device, a sailing electronic device (for example, a sailing navigation device, a gyroscope, a compass), avionics, a security device, an industrial or home robot, or the like.

According to various embodiments of the disclosure, the electronic device may be a part of furniture, buildings/structures, an electronic board, an electronic signature receiving device, a projector, or various measuring instruments (for example, water meters, electricity meters, gas meters, or wave meters, and the like), or the like, including a communication function.

According to various embodiments of the disclosure, the electronic device may be a combination of the above-mentioned devices. In addition, it will be obvious to a person skilled in the art that the electronic device according to preferred embodiments of the disclosure is not limited to the devices described above.

An embodiment of the disclosure suggests a device and a method for transmitting/receiving a signal in a digital broadcasting system using one or more frequency bands.

In addition, an embodiment of the disclosure suggests a device and a method for transmitting a service using two or more frequency bands in a digital broadcasting system using one or more frequency bands.

In addition, an embodiment of the disclosure suggests a device and a method for receiving a service transmitted by using two or more frequency bands in a digital broadcasting system using one or more frequency bands.

The device and the method suggested in an embodiment of the disclosure are applicable to mobile broadcasting services, such as a terrestrial digital broadcasting service of ATSC 3.0, terrestrial UHDTV broadcast standards, a digital multimedia broadcasting (DMB, hereinafter, referred to as "DMB") service, digital video broadcasting-handheld (DVP-H, hereinafter, referred to as "DVP-H"), and an advanced television systems committee-mobile/handheld (ATSC-M/H, hereinafter, referred to as "ATSC-M/H") service, or the like, or various communication systems, such as a digital video broadcasting system such as an internet protocol television (IPTV, hereafter, referred to as "IPTV") service, a moving picture experts group (MPEG) media transport (MMT, hereinafter, referred to as "MMT") system, an evolved packet system (EPS, hereinafter, referred to as "EPS"), a long-term evolution (LTE, hereinafter, referred to as "LTE") mobile communication system, a long-term evolution advanced (LTE-A, hereinafter, referred to as "LTE-A") mobile communication system, a high speed downlink packet access (HDPDA, hereinafter, referred to as "HSPDA") mobile communication system, a high speed uplink packet access (HSUPA, hereinafter, referred to as "HSUPA") mobile communication system, a high rate packet data (HRPD, hereinafter, referred to as "HRPD") mobile communication system of $3^{rd}$ generation project partnership 2 (3GPP2, hereinafter, referred to as "3GPP2"), a wideband code division multiple access (WCDMA, hereinafter, referred to as "WCDMA") mobile communication system of 3GPP2, a code division multiple access (CDMA, hereinafter, referred to as "CDMA") mobile communication system of 3GPP2, a communication system such as a 802.16 m communication system of institute of electrical and electronics engineers (IEEE, hereinafter, referred to as "IEEE"), a mobile internet protocol (Mobile IP, hereinafter, referred to as "Mobile IP") system or the like.

FIG. 1 is a view to illustrate a schematic configuration of a transmission system according to an embodiment of the disclosure.

Referring to FIG. 1, a service includes media data 0101 constituting the service, and signaling 0102 for transmitting information necessary for obtaining and consuming the media data at a receiver. The media data may be encapsulated in a format suitable for transmission before being transmitted. In this case, the encapsulation method may follow a media processing unit (MPU) defined in ISO/IEC 23008-1 MPEG media transport (MMT) or a DASH segment format defined in ISO/IEC 23009-1 dynamic adaptive streaming over HTTP (DASH).

Specifically, the media data 0101 and the signaling 0102 are packetized by an application layer protocol. FIG. 1 illustrates that an MMT protocol (MMTP) 0111 defined in MMT and a real-time object delivery over unidirectional transport (ROUTE) protocol 0112 are used as application layer protocols according to an embodiment, but this should not be considered as limiting. In order to inform a receiver of which application layer protocol is used to transmit a specific service, information regarding an application protocol through which a service is transmitted independently from the application layer protocol should be transmitted.

For example, a service list table (SLT) 0115 illustrated in FIG. 1 may include information regarding the service, as signaling for informing the receiver of information regarding the application protocol, in the form of a table. The signaling including the packetized media data and the SLT is transmitted to a broadcast link layer 0140 through a user datagram protocol (UDP) 0120 and an Internet protocol (IP) 0130. The broadcast link layer may include, for example, an ATSC 3.0 link-layer protocol (ALP) defined in ATSC 3.0. The ALP generates an ALP packet with an input of an IP packet or a TS packet, and transmits the ALP packet to a broadcast physical layer 0150. In this case, signaling information necessary for controlling the broadcast link layer may be transmitted to the broadcast physical layer 0150 in the form of the ALP packet.

The broadcast physical layer 0150 generates a physical layer frame by signal-processing the ALP packet, and converts the physical layer frame into a wireless signal and transmits the wireless signal. Herein, the broadcast physical layer 0150 has at least one signal processing path. For example, the signal processing path may be a physical layer pipe (PLP) of DVB-T2 or ATSC 3.0, but this should not be considered as limiting. However, hereinafter, on the assumption that the signal processing path is the PLP, the descriptions will be made for convenience of explanation. All or a part of one or more services may be mapped onto one PLP. In this case, the receiver should signal-process one or more PLPs simultaneously to provide the service to a user. Herein, the ALP packets transmitted through one PLP are referred to as an ALP packet stream.

According to an embodiment of the disclosure, MPU of the media data 0101 is transmitted to the MMTP, and a DASH segment and files for a non-real time service are transmitted by using the ROUTE protocol. In this case, the signaling 0102 for reproducing the service formed of the media data is provided to the respective protocols.

According to an embodiment of the disclosure, the signaling 0102 may include a frequency band for transmitting the service, that is, information regarding an RF channel, and hereinafter, various embodiments of the disclosure will be described in detail with reference to the drawings.

Figure 2:
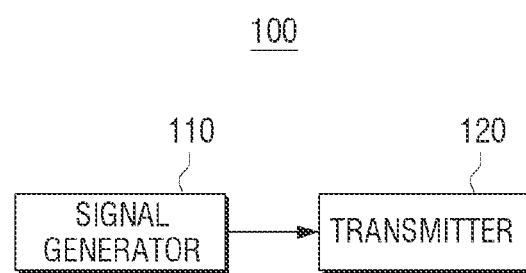
FIG. 2 is a block diagram illustrating a configuration of a transmission device according to an embodiment of the disclosure.

FIG. 2 is a block diagram illustrating a configuration of a transmission device according to an embodiment of the disclosure.

A service according to an embodiment of the disclosure may include components to be transmitted through one or more frequency bands, that is, an RF channel. Herein, when a set of one or more components that does not include all components of the service constitutes the service, the set of components will be referred to as a "portion." On the other hand, when a set includes all of the components of the service, and a set of one or more of these components is transmitted, the set will be referred to as a "duplicate." Each service indicated by the "portion" has only one "essential portion." Herein, the essential portion refers to a portion that can provide a meaningful presentation of the service without using the other portion ("non-essential portion"). However, a more appealing presentation may be provided when the non-essential portion is used. The "portion" or "duplicate" of the service may be transmitted through one RF channel without channel bonding. When channel bonding is applied to the ALP packet stream, the "portion" or "duplicate" of the service may be transmitted through the bonded RF channel. Hereinafter, a stream including an essential portion will be referred to as a primary stream, and a stream including a non-essential portion will be referred to as a secondary stream.

A signal generator 110 generates a broadcast signal including a service. Herein, the broadcast signal may be a wireless signal which is converted from the physical layer frame in the embodiment of FIG. 1, and the service may include media data mentioned in the embodiment of FIG. 1.

A transmitter 120 may transmit the broadcast signal through at least one RF channel. In this case, a broadcast stream transmitted through the RF channel may include signaling regarding the service. Herein, the broadcast stream is a concept of abstraction of the RF channel defined as a carrier frequency having the center with a specific bandwidth. The broadcast stream may be identified by a geographic area and a frequency. The PLP mentioned in FIG. 1 may correspond to a part of the RF channel, and each PLP may include a predetermined modulation and coding parameter.

The signaling regarding the service may include a predetermined identifier for identifying the broadcast stream, that is, the RF channel (or frequency band). For example, the identifier of the broadcast stream may be indicated by an abstraction identifier which is called a broadcast stream id (bsid). A bsid value may be a unique value in a regional level (for example, North America).

Herein, the signaling regarding the service may include information regarding whether the service is transmitted through a plurality of RF channels, and information regarding whether the broadcast stream transmitted through the corresponding RF channel includes the essential portion of the corresponding service. According to an embodiment, a specific attribute (or field) included in the SLT may indicate information regarding whether the service is transmitted through the plurality of RF channels, and may indicate whether the broadcast stream transmitted through the RF channel includes the essential portion of the corresponding service. For example, the presence/absence of the specific attribute (field) may indicate whether the service is transmitted through the plurality of RF channels, and, when the specific attribute is present, an attribute value may indicate whether the broadcast stream transmitted through the RF channel includes the essential portion of the corresponding service.

Specifically, when the signaling regarding the service includes a first attribute (or a first field), it may indicate that the service is transmitted through the plurality of RF channels. In addition, when an attribute value of the first attribute is a first value, it may indicate that the broadcast stream includes the essential portion of the service. In addition, when the attribute value of the first attribute is a second value, it may indicate that the broadcast stream includes the non-essential portion of the service. Herein, the first attribute, which is a Boolean attribute, may have an attribute value of "true" or "false." For example, the first value may be "true", and the second value may be "false."

In addition, when the attribute value of the first attribute is the first value, the signaling regarding the service may further include identifier information (@OtherBsid) (or a second attribute) (or a second field) regarding the identifier of the broadcast stream transmitting the non-essential portion of the service.

In addition, the signaling regarding the service may further include information (or type information (@type) or a third attribute) (or a third field) indicating whether the broadcast stream transmits the duplicate or portion of the service. When the corresponding information is a third value (for example, "1"), it may indicate that the broadcast stream transmits the duplicate of the service, and, when the corresponding information is a fourth value (for example, "2"), it may indicate that the broadcast stream transmits the portion of the service.

On the other hand, when the attribute value of the first attribute is the second value ("true"), the broadcast stream includes the non-essential portion of the service. Therefore, there exists at least one OtherBsid element in which the third attribute (@type) value is the fourth value (for example, "2").

According to various embodiments of the disclosure, the signaling regarding the service may be signaling corresponding to various layers shown in FIG. 1. In addition, the information regarding the broadcast stream according to an embodiment of the disclosure may be included in at least one piece of signaling of the signaling corresponding to the various layers.

According to an embodiment, the above-described information regarding the broadcast stream may be included in the SLT which signals basic information regarding the service. An embodiment of the disclosure in which the information regarding the broadcast stream is included in the SLT will be described in more detail in a third embodiment described below.

Hereinafter, various embodiments of the disclosure in which information regarding a broadcast stream is included in a variety of signaling and is transmitted will be described.

First Embodiment

Information regarding a broadcast stream according to an embodiment of the disclosure may be included in at least one of signaling providing information regarding an MMT service, and signaling providing information regarding a ROUTE service.

Table 1 presented below shows an example of signaling providing the information regarding the MMT service according to an embodiment of the disclosure:

TABLE 1

| Element or Attribute Name | Use | Data Type | Description |
|---|---|---|---|
| bundleDescriptionMMT | | | Root element of the User Service Bundle Description for MMT. |
| userServiceDescription | | | A single instance of an ATSC 3.0 Service. |
| @globalServiceID | 1 | anyURI | A globally unique URI that identifies the ATSC 3.0 Service. |
| @serviceId | 1 | unsignedShort | Reference to corresponding service entry in LLS (SLT). |
| @serviceStatus | 0 . . . 1 | boolean | Specify the status of this service as active or inactive. |
| Name | 0 . . . N | string | Name of the ATSC 3.0 service. |
| @lang | 1 | xml: lang | Language of the ATSC 3.0 service name. |
| serviceLanguage | 0 . . . N | string | Available languages of the ATSC 3.0 service |
| contentAdvisoryRating | 0 . . . N | | Specifies the content advisory rating, as defined in the ATSC 3.0 Service Announcement specification |
| Channel | 1 | | Contains information about the service |
| @serviceGenre | 0 . . . 1 | unsignedByte | Attribute indicates primary genre of the service. |
| @serviceIcon | 1 | anyURI | Attribute indicates the Uniform Resource Locator (URL) for the icon used to represent this service. |
| ServiceDescription | 0 . . . N | | Contains service description possibly in multiple languages. |
| @serviceDescrText | 1 | string | Attribute indicates description of the service. |
| @serviceDescrLang | 0 . . . 1 | string | Attribute indicates the language of the serviceDescrText. |
| mpuComponent | 0 . . . 1 | | A description about the contents components of ATSC 3.0 Service delivered as MPUs |
| @mmtPackageId | 1 | string | Reference to a MMT Package for content components of the ATSC 3.0 Service delivered as MPUs. |
| @contentIdSchemeIdUri | 0 . . . 1 | anyURI | Attribute indicates a URI to identify the scheme for Content ID associated to the current MMT Package. |
| @contentIdValue | 0 . . . 1 | string | Attribute indicates the value for Content ID associated to the current MMT Package. |
| @nextMmtPackageId | 0 . . . 1 | string | Reference to a MMT Package to be used after the one referenced by @mmtPackageId in time for content components of the ATSC 3.0 Service delivered as MPUs. |
| @nextContentIdSchemeIdUri | 0 . . . 1 | anyURI | Attribute indicates a URI to identify the scheme for Content ID associated to the next MMT Package. |
| @nextContentIdValue | 0 . . . 1 | string | Attribute indicates the value for Content ID associated to the next MMT Package. |
| routeComponent | 0 . . . 1 | | A description about locally-cached service content of ATSC 3.0 Service delivered by ROUTE. |
| @sTSIDUri | 1 | anyURI | Reference to the S-TSID fragment which provides access related parameters to the Transport sessions carrying contents of this ATSC 3.0 Service. |

TABLE 1-continued

| Element or Attribute Name | Use | Data Type | Description |
|---|---|---|---|
| @apdURI | 0 . . . 1 | anyURI | Reference to the APD fragment which contains file repair related information. |
| @sTSTDDestinationIpAddress | 0 . . . 1 | string (IP Address) | A string containing the dotted-IPv4 destination address of the packets carrying S-TSTD for this service. |
| @sTSTDDestinationUdpPort | 1 | unsignedShort (port) | Port number of the packets carrying S-TSID for this service. |
| @sTSIDSourceIpAddress | 1 | string (IP address) | A string containing the dotted-IPv4 source address of the packets carrying S-TSID for this service. |
| @sTSTDMajorProtocolVersion | 0 . . . 1 | unsignedByte | Major version number of the protocol used to deliver the S-TSTD for this service. |
| @sTSIDMinorProtocolVersion | 0 . . . 1 | unsignedByte | Minor version number of the protocol used to deliver the S-TSID for this service. |
| broadbandComponent | 0 . . . 1 | | A description about the contents components of ATSC 3.0 Service delivered by broadband. |
| @fullMPDUri | 1 | anyURI | Reference to an MPD fragment which contains descriptions for contents components of the ATSC 3.0 Service delivered over broadband. |
| ComponentInfo | 1 . . . N | | Contains information about components available in the service. For each component includes information about component type, component role, component name, component identifier, component protection flag. |
| @componentType | 1 | unsignedByte | Attribute indicates the type of this component. |
| @componentRole | 1 | unsignedByte | Attribute indicates the role or kind of this component. |
| @componentProtectedFlag | 0 . . . 1 | boolean | Attribute indicates if this component is protected |
| @componentId | 1 | string | Attribute indicates the identifier of this component. |
| @componentName | 0 . . . 1 | string | Attribute indicates the human readable name of this component. |

Table 2 presented below shows an example of signaling providing the information regarding the ROUTE service according to an embodiment of the disclosure:

TABLE 2

| Element or Attribute Name | Use | Data Type | Description |
|---|---|---|---|
| bundleDescriptionROUTE | | | Root element of the User Service Bundle Description for ROUTE/DASH. |
| userServiceDescription | | | A single instance of an ATSC 3.0 Service. |
| @globalServiceID | 0 . . . 1 | anyURI | A globally unique URI that identifies the ATSC 3.0 Service. This attribute is optional for the ESG and EAS services. |
| @serviceId | 1 | unsignedShort | Reference to corresponding service entry in the SLT. |
| @serviceStatus | 0 . . . 1 | boolean | Specify the status of this service as active or inactive. |
| @fullMPDUri | 0 . . . 1 | anyURI | Reference to an MPD fragment that contains descriptions for content components of the ATSC 3.0 Service delivered over broadcast and/or broadband. This attribute is not applicable to and therefore shall be absent for ESG and EAS services. |

TABLE 2-continued

| Element or Attribute Name | Use | Data Type | Description |
|---|---|---|---|
| @sTSIDUri | 1 | anyURI | Reference to the S-TSID fragment which provides access related parameters for the Transport sessions carrying contents of this ATSC 3.0 Service. |
| name | 0 . . . N | string | Name of the ATSC 3.0 service. |
| @lang | 1 | language | Language of the ATSC 3.0 service name. |
| serviceLanguage | 0 . . . N | language | Available languages of the ATSC 3.0 service. |
| deliveryMethod | 0 . . . N | | Container of transport-related information pertaining to the contents of the service over broadcast and (optionally) broadband modes of access. This element is not applicable to and therefore shall be absent for ESG and EAS services. |
| @apdUri | 0 . . . 1 | anyURI | Reference to the APD fragment which contains file repair related information. |
| broadcastAppService | 0 . . . N | | A DASH Representation delivered over broadcast containing the corresponding media component(s) belonging to the ATSC 3.0 Service. |
| bundleDescriptionROUTE | | | Root element of the User Service Bundle Description for ROUTE/DASH. |
| basePattern | 1 . . . N | string | A character pattern for use by the ATSC receiver to match against any portion of the Segment URL used by the DASH Client to request DASH Media Segments of a parent DASH Representation. |
| unicastAppService | 0 . . . N | | A DASH Representation delivered over broadband containing the constituent media content component(s) belonging to the ATSC 3.0 Service. |
| basePattern | 1 . . . N | string | A character pattern for use by the ATSC receiver to match against any portion of the Segment URL used by the DASH Client to request DASH Media Segments of a parent DASH Representation. |

The information regarding the broadcast stream according to an embodiment of the disclosure may be included in at least one of bundleDescriptionMMT and bundleDescriptionROUTE described above. For example, when a frequency band for transmitting signaling information for indicating a bsid is a fundamental frequency band, and a service described by at least one of bundleDescriptionMMT and bundleDescriptionROUTE is transmitted in one frequency band, the bsid regarding the fundamental frequency band may be omitted, and only information regarding other frequency band than the fundamental frequency band may be provided.

When the service is transmitted through a plurality of frequency bands, at least one of bundleDescriptionMMT and bundleDescriptionROUTE may additionally include attributes indicating utilization types of the plurality of frequency bands. For example, the utilization types of the plurality of frequency bands may be indicated by "@multiRFType" as follows:

@multiRFType-0: Single RF frequency, 1: additional, 2: Plain channel bonding, 3: Channel bonding with SNR averaging According to an embodiment, when a value of "@multiRFType" is "1: additional," it may indicate that the service described by the Service element is able to be reproduced only by data transmitted through the fundamental frequency band, and additional media data and files are transmitted through the other frequency band.

According to another embodiment, the service described by at least one of bundleDescriptionMMT and bundleDescriptionRoute may not be able to be reproduced only by the data transmitted through the fundamental frequency band. A complementary value indicating this may be added to the @multiRFtype attribute. Plain channel bonding and Channel bonding with SNR averaging are values indicating a reception chip operation of a physical layer rather than an IP layer, and will be described in detail below.

Second Embodiment

According to another embodiment of the disclosure, the information regarding the broadcast stream may be transmitted through a portion of the signaling indicating an upper level transmission path of the media data. The upper level transmission path indicates an address of an upper layer which is higher than the IP. For example, in the embodiment illustrated in FIG. 1, the address of the upper layer may include a destination IP address and a UDP port number, and may selectively include a source IP address. In addition, when the MMTP is used, the address of the upper layer may further include packet_id. In addition, when the ROUTE is used, the address of the upper layer may further include a transport session identifier (TSI).

The upper layer address in the MMT service according to an embodiment of the disclosure may be signaled based on an MMT package (MP) table.

Table 3 presented below shows an example of signaling providing information regarding the upper level transmission path of the media data constituting the MMT service.

TABLE 3

| Syntax | Value | No. of bits | Mnemonic |
|---|---|---|---|
| MP_table( ) { | | | |
|     table_id | | 8 | uimsbf |
|     version | | 8 | uimsbf |
|     length | | 16 | uimsbf |
|     reserved | '11 1111' | 6 | bslbf |
|     MP_table_mode | | 2 | bslbf |
|     if ((table_id == 0x10) or (table_id == 0x11)) {MMT_package_id { | N1 | | |
|         MMT_package_id_length | | 8 | uimsbf |
|         for (i=0; i<N1; i++) { | | | |
|             MMT_package_id_byte | | 8 | uimsbf |
|         } | | | |
|     } | | | |
|     } | N2 | | |
|     MP_table_descriptors { | | | |
|         MP_table_descriptors_length | | 16 | uimsbf |
|         for (i=0; i<N2; i++) { | | | |
|             MP_table_descriptors_byte | | 8 | uimsbf |
|         } | | | |
|     } | | | |
| } | | | |
| number_of_assets | N3 | 8 | uimsbf |
| for (i=0; i<N3; i++) { | | | |
|     Identifier_mapping( ) | | | |
|     asset_type | | 32 | char |
|     reserved | '1111 11' | 6 | bslbf |
|     default_asset_flag | | 1 | bslbf |
|     asset_clock_relation_flag | | 1 | bslbf |
|     if (asset_clock_relation_flag == 1) { | | | |
|         asset_clock_relation_id | | 8 | uimsbf |
|         reserved | '1111 111' | 7 | bslbf |
|         asset_timescale_flag | | 1 | bslbf |
|         if (asset_time_scale_flag == 1) { | | | |
|             asset_timescale | | 32 | uimsbf |
|         } | | | |
|     } | | | |
|     asset_location { | | | |
|       location_count | N4 | 8 | uimsbf |
|         for (i=0; i<N4; i++) { | | | |
|     MMT_general_location_info( ) | | | |
|         } | | | |
|     } | | | |
|     asset_descriptors { | N5 | 16 | uimsbf |
|         asset_descriptors_length | | | |
|         for (j=0; j<N5; j-+) { | | 8 | uimsbf |
|             asset_descriptors_byte | | | |
|         } | | | |
|     } | | | |
|   } | | | |
| } | | | |

Table 4 presented below shows MP table mode values included in table 1.

Table 5 presented below shows an asset_id value included in table 3.

TABLE 4

| Value | Description |
|---|---|
| 00 | "sequential_order_processing_mode" |
| 01 | "order_irrelevant_processing_mode" |
| 10 | "independent_processing_mode" |
| 11 | Reserved |

TABLE 5

| Syntax | Value | No. of bits | Mnemonic |
|---|---|---|---|
| asset_id( ){ | | | |
|     asset_id_scheme | | 32 | uimsbf |
|     asset_id_length | N | 8 | uimsbf |
|     for (j=0; j < N; j++) { | | | |
|         asset_id_byte | | 8 | uimsbf |
|     } | | | |
| } | | | |

Table 6 presented below shows MMT_generat1_ location_info_for_asset-location values included in table 3.

TABLE 6

| Syntax | Value | No. of bits | Mnemonic |
|---|---|---|---|
| MMT_general_location_info( ) { | | | |
|   location_type | | 8 | uimsbf |
|   if (location_type == 0x00) { | | | |
|     packet_id | | 16 | uimsbf |
|   } else if (location_type == 0x01) { | | | |
|     ipv4_src_addr | | 32 | uimsbf |
|     ipv4_dst_addr | | 32 | uimsbf |
|     dst_port | | 16 | uimsbf |
|     packet_id | | 16 | uimsbf |
|   } else if (location_type == 0x02) { | | | |
|     ipv6_src_addr | | 128 | uimsbf |
|     ipv6_dst_addr | | 128 | uimsbf |
|     dst_port | | 16 | uimsbf |
|     packet_id | | 16 | uimsbf |
|   } else if (location_type == 0x03) { | | | |
|     network_id | | 16 | uimsbf |
|     MPEG_2_transport_stream_id | | 16 | uimsbf |
|     reserved | '111' | 3 | bslbf |
|     MPEG_2_PID | | 13 | uimsbf |
|   } else if ( location_type == 0x04) { | | | |
|     ipv6_src_addr | | 128 | uimbsf |
|     ipv6_dst_addr | | 128 | uimbsf |
|     dst_port | | 16 | uimbsf |
|     reserved | '111' | 3 | bslbf |
|     MPEG_2_PID | | 13 | uimbsf |
|   } else if (location_type == '0x05') { | | | |
|     URL_length | N1 | 8 | uimsbf |
|     for (i=0; i<N1; i++) { | | | |
|       URL_byte | | 8 | char |
|     } | | | |
|   } else if (location_type == '0x06') { | | | |
|     length | N2 | 16 | uimsbf |
|     for (i=0;i<N2;i++) { | | | |
|       byte | | 8 | uimsbf |
|     } | | | |
|   } else if (location_type == '0x07') { | | | |
|   } else if (location_type == '0x08') { | | | |
|     message_id | | 8 | uimsbf |
|   } else if (location_type == '0x09') { | | | |
|     packet_id | | 16 | uimsbf |
|     message_id | | 8 | uimsbf |
|   } else if (location_type == '0x0A') { | | | |
|     ipv4_src_addr | | 32 | uimsbf |
|     ipv4_dst_addr | | 32 | uimsbf |
|     dst_port | | 16 | uimsbf |
|     packet_id | | 16 | uimsbf |
|     message_id | | 8 | uimsbf |
|   } else if (location_type == '0x0B') { | | | |
|     ipv6_src_addr | | 128 | uimsbf |
|     ipv6_dst_addr | | 128 | uimsbf |
|     dst_port | | 16 | uimsbf |
|     packet_id | | 16 | uimsbf |
|     message_id | | 8 | uimsbf |
|   } else if(location_type == '0x0C') { | | | |
|     ipv4_src_addr | | 32 | uimbsf |
|     ipv4_dst_addr | | 32 | uimbsf |
|     dst_port | | 16 | uimbsf |
|     reserved | '111' | 3 | bslbf |
|     MPEG_2_PID | | 13 | uimbsf |
|   } | | | |
| } | | | |

Table 7 presented below shows location type values included in table 3.

TABLE 7

| Value | Description |
|---|---|
| 0x00 | An Asset in the same MMTP packet flow as the one that carries the data structure to which this MMT_general_location_info( ) belongs |
| 0x01 | MMTP packet flow over UDP/IP (version 4) |
| 0x02 | MMTP packet flow over UDP/IP (version 6) |
| 0x03 | An elementary stream within an MPEG-2 TS in a broadcast network. |
| 0x04 | An elementary stream (ES) in an MPEG-2 TS over the IP broadcast network |

TABLE 7-continued

| Value | Description |
|---|---|
| 0x05 | URL |
| 0x06 | reserved for private location information |
| 0x07 | The same signalling message as the one that carries the data structure to which this MMT_general_location_info( ) belongs |
| 0x08 | A signalling message delivered in the same data path as the one that carries the data structure to which this MMT_general_location_info( ) belongs |
| 0x09 | A signalling message delivered in a data path in the same UDP/IP flow as the one that carries the data structure to which this MMT_general_location_info( ) belongs |
| 0x0A | A signalling message delivered in a data path in a UDP/IP (version 4) flow |
| 0x0B | A signalling message delivered in a data path in a UDP/IP (version 6) flow |
| 0x0C | An elementary stream (ES) in an MPEG-2 TS over the IP v4 broadcast network |
| 0x0D~0x9F | reserved for ISO use |
| 0xA0~0xFF | reserved for private use |

The information regarding the broadcast stream according to another embodiment of the disclosure may be included in the signaling for providing the information regarding the upper level transmission path of the media data constituting the above-described MMT service. For example, the information regarding the broadcast stream may be included in the asset_descriptors of the MP table shown in table 3. In this case, the bsid included in the asset_descriptors of the MP table may have a format described in table 8 presented below.

In the corresponding embodiment, when one asset is transmitted through one frequency band, the num_bsid field of table 8 may be omitted or may include a default value (for example, 1). In addition, when the asset described by the bsid_descriptor is transmitted through the fundamental frequency band, the bsid_descriptor may be omitted.

TABLE 8

| Syntax | Value | No. of bits | Mnemonic |
|---|---|---|---|
| bsid_descriptor( ) { | | | |
|   descriptor_tag | | 16 | uimsbf |
|   descriptor_length | | 8 | uimsbf |
|   num_bsid | N1 | 8 | uimsbf |
|   for ( i = 0 ; i < N1 ; i++ ) { | | | |
|     bsid | | 16 | uimsbf |
|   } | | | |
| } | | | |

According to another embodiment, the information regarding the broadcast stream may be included in an mmt_atsc3_message( ) payload of table 10. In this case, the information regarding the broadcast stream may have a format described in table 9.

In the corresponding embodiment, when one asset is transmitted through one frequency band, the num_bsid field of table 8 may be omitted or may include a default value (for example, 1). In addition, when the asset described by the bsid_descriptor is transmitted through the fundamental frequency band, the bsid_descriptor may be omitted. In addition, the bsid_descriptor may include only information regarding the asset using a frequency band other than the fundamental frequency band.

TABLE 9

| Syntax | Value | No. of bits | Mnemonic |
|---|---|---|---|
| bsid_descriptor( ) { | | | |
|   descriptor_tag | | 16 | uimsbf |
|   descriptor_length | | 16 | uimsbf |
|   numer_of_assets | N1 | 8 | uimsbf |
|   for ( i = 0 ; i < N1 ; i+− ) { | | | |
|     asset_id_length | N2 | 8 | uimsbf |
|     for( j = 0 ; j < N2 ; j+− ) { | | | |
|       asset_id_byte | | 8 | uimsbf |
|     } | | | |
|     num_bsid | N3 | 8 | uimsbf |
|     for( j = 0 ; j < N3 ; j+− ) { | | | |
|       bsid | | 16 | uimsbf |
|     } | | | |
|   } | | | |
| } | | | |

TABLE 10

| Syntax | No. of Bits | Format |
|---|---|---|
| mmt_atsc3_message( ) { | | |
|   message_id | 16 | uimsbf |
|   version | 8 | uimsbf |
|   length | 32 | uimsbf |
|   message payload { | | |
|     service_id | 16 | uimsbf |
|     atsc3_message_content_type | 16 | uimbsf |
|     atsc3_message_content_version | 8 | uimbsf |
|     atsc3_message_content_compression | 8 | uimbsf |
|     URI_length | 8 | uimbsf |
|     for (i=0;i< URI_length;i−−) { | | |
|       URI_byte | 8 | uimsbf |
|     } | | |
|     atsc3_message_content_length | 32 | uimsbf |
|     for (i=0;i<atsc3_message_content_length;i++) { | | |
|       atsc3_message_content_byte | 8 | uimsbf |
|     } | | |
|     for (i=0;i<length-11-URI_length-atsc3_message_content_length) { | | |
|       reserved | 8 | uimsbf |
|     } | | |
|   } | | |
| } | | |

Table 11 presented below shows atsc3_message_content_type values included in table 10.

TABLE 11

| atsc3_message_content_type | Meaning |
|---|---|
| 0x0000 | Reserved |
| 0x0001 | userServiceDescription |
| 0x0002 | MPD as given in MPEG DASH. |
| 0x0003 | Application Signaling Table, Application Signaling and Triggers |
| 0x0004 | Application Event Information, Application Signaling and Triggers |
| 0x0005 | Video Stream Properties Descriptor |
| 0x0006 | ATSC Staggercast Descriptor |
| 0x0007 | Inband Event Descriptor, Application Signaling and Triggers |
| 0x0008 | Caption Asset Descriptor, Captions and Subtitles |
| 0x0009 | Audio Stream Properties Descriptor |
| 0x000A | Bsid Descriptor |
| 0x000B~0xFFFF | Reserved for future use |

An upper layer address in the ROUTE service according to an embodiment of the disclosure may be signaled based on service-based transport session instance description (S-TSID).

An example of signaling for providing information regarding the upper level transmission path of the media data constituting the ROUTE service according to an embodiment of the disclosure is as shown in table 12 presented below.

TABLE 12

| Element and Attribute Names | Use | Data Type | Description |
|---|---|---|---|
| S-TSID | | | Service Transport Session Instance Description |
| @serviceId | 0 . . . 1 | unsignedShort | Reference to corresponding service element in the USBD fragment. |
| RS | 1 . . . N | | ROUTE session |
| @sIpAddr | 0 . . . 1 | string | Source IP address of this ROUTE session; mandatory for ROUTE session other than session carrying SLS (session signaled in SLT); defaults to session carrying SLS. |
| @bsid | 0 . . . 1 | unsignedShort | Identifier of the Broadcast Stream within which the content component(s) of the broadcast service are carried. |
| @dlpAddr | 0 . . . 1 | string | Destination IP address of this ROUTE session; mandatory for ROUTE session other than session carrying SLS (session signaled in SLT); defaults to session carrying SLS. |
| @dport | 0 . . . 1 | unsignedShort | Destination port of this ROUTE session; mandatory for ROUTE session other than session carrying SLS (session signaled in SLT); defaults to session carrying SLS. |
| LS | 1 . . . N | | LCT channel |
| @tsi | 1 | unsignedInt | TSI value |
| @bw | 0 . . . 1 | unsignedInt | Maximum bandwidth |
| @startTime | 0 . . . 1 | dateTime | Start time |
| @endTime | 0 . . . 1 | dateTime | End time |
| SrcFlow | 0 . . . 1 | srcFlowType | Information about the Source Flow |
| RepairFlow | 0 . . . 1 | rprFlowType | Information about the Repair Flow | in the case of specific standards, multicast address 224.0.23.60, destination port 4937/u may be used as an address only for the LLS.

According to an embodiment of the disclosure, the SLT may include information indicating whether the service is transmitted through a plurality of RF channels, and information indicating whether the broadcast stream transmitted through the RF channel includes the essential portion of the corresponding service. According to an embodiment, a specific attribute included in the SLT may indicate information indicating whether the service is transmitted through the plurality of RF channels, and may indicate whether the broadcast stream transmitted through the RF channel includes the essential portion of the corresponding service. For example, the presence/absence of the specific attribute included in the SLT may indicate whether the service is transmitted through the plurality of RF channels, and, when the specific attribute is present, an attribute value may indicate whether the broadcast stream transmitted through the RF channel includes the essential portion of the corresponding service.

For example, when the SLT includes a first attribute (for example, "@essential" of table 13), it may indicate that the service is transmitted through the plurality of RF channels. In addition, when the first attribute (for example, @essential of table 13) includes a value of "true," it may indicate that Third Embodiment According to an embodiment, the information regarding the broadcast stream described above may be included in a service list table (SLT) providing basic information regarding the service, and may be transmitted. Herein, the SLT is a kind of low level signaling (LLS), and may be transmitted in the form of an LLS table in a UDP/IP packet transmitted to a specific multicast address and a UDP port. For example, the corresponding broadcast stream, that is, the broadcast stream including the SLT, includes the essential portion of the service, and, when the first attribute (for example, @essential of table 13) includes a value of "false," it may indicate that the corresponding broadcast stream includes the non-essential portion of the service.

Table 13 presented below shows an example of the SLT according to an embodiment of the disclosure.

TABLE 13

| Element or Attribute Name | Use | Data Type | Short Description |
|---|---|---|---|
| SLT | | | Root element of the SLT |
| @bsid | 1 | slt: listOfUnsignedShort | Identifies the one or more Broadcast Streams comprising the Services. |
| SLTCapabilities | 0 . . . 1 | sa: CapabilitiesType | Required capabilities for decoding and meaningfully presenting the content for all the services in this SLT instance. |
| SLTInetUrl | 0 . . . N | anyURI | Base URL to acquire ESG or service layer signalling files available via broadband for services in this SLT. |
| @urlType | 1 | unsignedByte | Type of files available with this URL |
| Service | 1 . . . N | | Service information |
| @serviceId | 1 | unsignedShort | Integer number that identifies this Service within the scope of this Broadcast area. |
| @globalServiceId | 0 . . . 1 | anyURI | A globally unique URI that identifies the ATSC 3.0 Service. This attribute is not present for the ESG and EAS services. |
| @sltSvcSeqNum | 1 | unsignedByte | Version of SLT service info for this service. |
| @protected | 0 . . . 1 | boolean | Indicates whether one or more components needed for meaningful presentation of this service are protected (e.g. encrypted). |
| @majorChannelNo | 0 . . . 1 | unsignedShort 1 . . . 999 | Major channel number of the service |
| @minorChannelNo | 0 . . . 1 | unsignedShort 1 . . . 999 | Minor channel number of the service |
| @serviceCategory | 1 | unsignedByte | Service category, coded per Table 6.4 |
| @shortServiceName | 0 . . . 1 | string | Short name of the Service |
| @hidden | 0 . . . 1 | boolean | Indicates whether the service is intended for testing or proprietary use, and is not to be selected by ordinary TV receivers. |
| @broadbandAccessRequired | 0 . . . 1 | boolean | Indicates whether broadband access is required for a receiver to make a meaningful presentation of the service. |
| @essential | 0 . . . 1 | boolean | Indicates if the essential portion of the Service is delivered via this Broadcast Stream. |
| SimulcastTSID | 0 . . . 1 | unsignedShort | Identifier of an ATSC 1.0 broadcast stream carrying the same programming content. |
| @simulcastMajorChannelNo | 0 . . . 1 | unsignedShort 1 . . . 999 | Major channel number of the ATSC 1.0 service carrying the same programming content. |
| @simulcastMinorChannelNo | 0 . . . 1 | unsignedShort 1 . . . 999 | Minor channel number of the ATSC 1.0 service carrying the same programming content. |
| SvcCapabilities | 0 . . . 1 | sa: CapabilitiesType | Required capabilities for decoding and meaningfully presenting content of this service. |
| BroadcastSvcSignaling | 0 . . . 1 | | Location, protocol, address, id information for broadcast signaling |
| @slsProtocol | 1 | unsignedByte | Protocol used to deliver the service layer signalling for this service |
| @slsMajorProtocolVersion | 0 . . . 1 | unsignedByte | Major version number of protocol used to deliver Service Layer Signalling for this service. |
| @slsMinorProtocolVersion | 0 . . . 1 | unsignedByte | Minor version number of protocol used to deliver Service Layer Signalling for this service. |
| @slsDestinationIpAddress | 1 | IPv4address | A string containing the dotted-IPv4 destination address of the packets carrying broadcast SLS data for this service. |
| @slsDestinationUdpPort | 1 | unsignedShort | Port number of the packets carrying broadcast SLS data for this service. |
| @slsSourceIpAddress | 0 . . . 1 | IPv4address | A string containing the dotted-IPv4 source address of the packets carrying broadcast SLS data for this service. |
| svcInetUrl | 0 . . . N | anyURI | URL to access Internet signalling for this service |
| @urlType | 1 | unsignedByte | Type of files available with this URL |
| otherBsid | 0 . . . N | slt: listOfUnsignedShort | Identifier(s) of other Broadcast Stream(s) that deliver duplicates or portions of this Service |
| @type | 1 | unsignedByte | Indicates whether the Broadcast Stream identified by the OtherBsid delivers a duplicate or a portion of this service. |

When the service described by the service element of the SLT is transmitted through a plurality of frequency bands, that is, the plurality of RF channels, bsid information regarding one frequency band (or fundamental frequency band) may be transmitted to a root element of the SLT, and bsid information regarding another frequency band may be provided to a subordinate attribute of the service element.

For example, in table 13, "@bsid" is a list of unsigned integers of 16 bits, and identifies a broadcast stream ID of an original emission signal. A value of each @bsid is the same as a value signaled to the L1D_bsid in L1 detail signaling in the physical layer. When the service is transmitted through channel bonding in the physical layer, the corresponding list includes a BSID value of each RF emission included in bonding.

When an attribute of "@essential" exists, it may indicate that the service includes more than one portions which are transmitted through more than one RF channels. Herein, the corresponding attribute may be a Boolean attribute.

When the attribute of "@essential" does not exist, it may indicate that all portions of the service are transmitted through the corresponding RF channel. When the @essential value is set to "true," it may indicate that the essential portion of the service is transmitted through the corresponding broadcast stream. When the @essential value is set to "false," it may indicate that the non-essential portion of the service is transmitted through the corresponding broadcast stream. When the @essential value is "true," at least one OtherBsid element where a @type value is "2" exists for the service. When the OtherBsid element does not exist for the service, a default value does not exist.

"OtherBsid" is a list of unsigned short integer values, and each instance indicates an identifier of another broadcast stream transmitting the duplicate or portion of the service. Each instance format of the OtherBsid is the same as the format of the @bisd. When an @essential attribute exists for a parent service element and is set to "true," at least one OtherBsid element may exist.

When the @essential attribute exists for the parent service element and is set to "false," the OtherBsid element does not exist. When the @essential attribute for the parent service element does not exist, one or more OtherBsid elements where the @type value is "1" exist. When the OtherBsid element does not exist for the service, the default value may not exist.

"@type" is a list of an unsigned byte integer value, and instance included in the list indicates whether the broadcast stream identified by the OtherBsid transmits a duplicate or a portion of the service. When the value of @type is "1," it may indicate that the corresponding service element is a duplicate of the service in the broadcast stream identified by the OtherBsid. When the value of @type is "2," it may indicate that the corresponding service element is a portion of the service having a component in the broadcast stream identified by the OtherBsid. In this case, the service identifier is given as a value of an @serviceId attribute of the parent service element. When more than one OtherBsid elements exist under the parent service element, OtherBsid@type attribute values of all elements are the same.

Tables 14, 15, 16 presented below show values of urlType, serviceCategory, slsProtocol included in table 13.

TABLE 14

| urlType | Meaning |
| --- | --- |
| 0 | Reserved |
| 1 | URL of Service Layer Signaling Server (providing access to the Service Layer Signaling, as specified in Section 7). |
| 2 | URL of ESG server (providing access to the ESG data |
| 3 | URL of Service Usage Data Gathering Report server (for use in reporting service usage) |
| Other values | Reserved for future use |

TABLE 15

| serviceCategory | Meaning |
| --- | --- |
| 0 | Reserved |
| 1 | Linear A/V service |
| 2 | Linear audio only service |
| 3 | App-based service |
| 4 | ESG service (program guide) |
| 5 | EAS service (emergency alert) |
| Other values | Reserved for future use |

TABLE 16

| slsProtocol | Meaning |
| --- | --- |
| 0 | Reserved |
| 1 | ROUTE |
| 2 | MMTP |
| other values | Reserved for future use |

According to an embodiment of the disclosure, when the "portions" or "duplicates" of all services are transmitted without channel bonding, service list tables (SLT), service-based transport session instance descriptions (S-TSIDs), MMT package table message (MPT messages) follow the following signaling rules:

*The service indicated by the service portions or duplicates is included in the SLT of the RF channel indicated by the portions or duplicates. Listings indicated by the portions or duplicates have the same service ID value, and have the same major/minor channel number value. This enables the portions or duplicates of the service transmitted through the plurality of RF channels to be integrated into one service on a channel map of a receiver when the receiver scans channels. An SLT entry of the essential portion or duplicate may include broadcast stream identifiers (BSIDs) of the broadcast stream which can be found by the other portions or duplicate.

*Regarding the ROUTE/DASH, the S-TSID may be transmitted through the PLP of each RF channel transmitting the service portion or duplicate. The S-TSID regarding each service portion or duplicate describes ROUTE sessions and LCT channels regarding each component of the service portion or duplicate.

*Regarding the MMTP/MPU, the MPT message may be transmitted through each RF channel transmitting the essential portion or duplicate.

According to another embodiment of the disclosure, when the service portions are transmitted by channel bonding, that is, when the service portions are transmitted through more than one RF channels (that is, bonded RF channels), the SLTs, the S-TSIDs, and the MPT message follow the following signaling rules:

1) When the "essential portion" of the service is transmitted by a non-bonded PLP of the RF channel;

*the SLT related to both the non-bonded PLP and the bonded PLP transmitting the portion of the service lists the services. Listings of the service indicated by the portion have the same service ID value and the same major/minor channel number value. Only the SLT entry regarding the essential portion of the service lists the BSIDs of the broadcast streams that can be found by the other portions.

*Regarding the ROUTE/DASH, the S-TSID is transmitted through (a) a single, non-bonded PLP of each RF channel transmitting one or more service portions through the non-bonded PLP, or (b) a bonded PLP of the bonded RF channel transmitting the other service portion. In the case of (a), each S-TSID instance describes ROUTE sessions and LCT channels regarding each component of the service portion transmitted by the non-bonded PLP corresponding to the RF channel to which the PLP transmitting the S-TSID belongs. In the case (b), each S-TSID instance describes ROUTE sessions and LCT channels regarding each component of the service portion transmitted by the bonded PLP corresponding to the bonded RF channel to which the PLP transmitting the S-TSID belongs.

*Regarding the MMTP/MPU, the MPT message may be transmitted through a single, non-bonded PLP of the RF channel transmitting the essential portion of the service.

2) When the "essential portion" of the service is transmitted by the bonded PLP of the bonded RF channel;

*only one SLT related to the bonded PLP transmitting the essential portion of the service lists the services. The SLT instance of the service lists the BSIDs of the broadcast streams that can be found by the other service portions.

*Regarding the ROUTE/DASH, one S-TSID regarding the service may be transmitted through the bonded PLP of the bonded RF channel transmitting the essential portion of the service. The S-TSID instance describes ROUTE sessions and LCT channels regarding all components of the service.

*Regarding the MMTP/MPU, the MPT message may be transmitted through the bonded PLP of the bonded RF channel transmitting the essential portion of the service.

3) According to still another embodiment, when the service duplicates are transmitted by channel bonding, that is, when the service duplicates are transmitted through the bonded PLP(s) of the bonded RF channel, the SLTs, the S-TSIDs, and the MPT messages follow the following signaling rules.

*The SLT related to both the non-bonded PLP and the bonded PLP transmitting the duplicates of the service lists the services. Listings of the service indicated by the duplicates have the same service ID value and the same major/minor channel number value. An SLT entry regarding the duplicates of the service lists the BSIDs of the broadcast streams that can be found by the other duplicates.

*Regarding the ROUTE/DASH, the S-TSID is transmitted through (a) the single, non-bonded PLP of each RF channel transmitting the service duplicates, or (b) the single, bonded PLP of the bonded RF channel transmitting the other service duplicates. In the case of (a), the S-TSID instance describes ROUTE sessions and LCT channels regarding each component of the service duplicates transmitted by the non-bonded PLP corresponding to the RF channel to which the PLP transmitting the S-TSID belongs. In the case of (b), each S-TSID instance describes ROUTE sessions and LCT channels regarding each component of the service duplicates transmitted by the bonded PLP corresponding to the bonded RF channel to which the PLP transmitting the S-TSID belongs.

*Regarding the MMTP/MPU, the MPT message is transmitted through (a) the single, non-bonded PLP of each RF channel transmitting the service duplicates, or (b) the single, bonded PLP of the bonded RF channel transmitting the other service duplicates.

The receiver requires a plurality of tuners, that is, the same number of tuners as the number of RF channels, to restore an ALP packet stream from the plurality of bonded PLPs. A single tuner receiver should obtain the SLT describing the service in order to obtain the service to which channel bonding is applied. When the S-TSID of the service is obtained by a single tuner tuned to a specific RF channel, all components listed in the S-TSID may be obtained by the single tuner tuned to the same RF channel.

According to another embodiment of the disclosure, the utilization types of the plurality of frequency bands may be indicated by "@multiRFType."

@multiRFType-0: Single RF frequency, 1: additional, 2: Plain channel bonding, 3: Channel bonding with SNR averaging.

When a value of corresponding information is "1: additional," it may indicate that the service described by the Service element is able to be reproduced only by data transmitted through the fundamental frequency band, and only additional media data and files are transmitted through the other frequency band.

According to another embodiment of the disclosure, the service described by the Service element may not be able to be reproduced only by the data transmitted through the fundamental frequency band, and a Complementary value indicating this may be added to the @multiRFType attribute. Plain channel bonding and Channel bonding with SNR averaging are values indicating a reception chip operation of a physical layer rather than an IP layer, and will be described in detail below.

According to another embodiment of the disclosure, when the service described by the Service element is not be able to be reproduced only by the data transmitted through the fundamental frequency band, information regarding this may be provided as a code value of the @svcCapabilities attribute of the SLT. That is, in the above-described embodiment, code values corresponding to Complementary, Plain channel bonding, Channel bonding with SNR averaging may be provided as the @svcCapabilities attribute. In this case, the receiver, for example, the receiver capable of receiving only one frequency band, may determine whether it is possible to provide the service based on these code values.

The broadcast link layer 0140 according to an embodiment of the disclosure may multiplex a plurality of multicasts and link layer signaling into one link layer packet stream. Herein, the link layer packet stream is treated as one logical channel in the physical layer.

The logical channel is transmitted through one PLP except for the case where channel bonding is used. The multicast is defined as a source IP address, a destination IP address, a source UDP port, a destination UDP port. The link layer signaling may include a list of multicasts transmitted through one logical channel, additional information for processing an ALP packet, and information for compressing an IP header, etc.

Table 17 presented below shows a link mapping table (LMT), which is an example of the link layer signaling including the list of multicasts and the additional information for processing the ALP packet in the link layer signaling according to an embodiment of the disclosure.

TABLE 17

| Syntax | No. of bits | Format |
|---|---|---|
| link_mapping_table( ) { | | |
|    num_PLPs_minus1 | 6 | uimsbf |
|    reserved | 2 | '11' |
|    for (i=0; i<=num_PLPs_minus1; i++) { | | |
|       PLP_ID | 6 | uimsbf |
|       reserved | 2 | '11' |
|       num_multicasts | 8 | uimsbf |
|       for (j=0; j<num_multicasts; j++) { | | |
|          src_IP_add | 32 | uimsbf |
|          dst_IP_add | 32 | uimsbf |

TABLE 17-continued

| Syntax | No. of bits | Format |
|---|---|---|
|     src_UDP_port | 16 | uimsbf |
|     dst_UDP_port | 16 | uimsbf |
|     SID_flag | 1 | bslbf |
|     compressed_flag | 1 | bslbf |
|     reserved | 6 | '111111' |
|     if (SID_flag == 1) { | | |
|         SID | 8 | uimsbf |
|     } | | |
|     if (compressed_flag == 1) | | |
| { | | |
|         context_id | 8 | uimsbf |
|     } | | |
|     } | | |
|   } | | |
| } | | |

Table 18 presented below shows a ROHC-U description table (RDT) which is an example of the link layer signaling including the information for compressing the header in the link layer signaling according to an embodiment of the disclosure.

TABLE 18

| Syntax | No. of bits | Format |
|---|---|---|
| ROHC-U_description_table( ) { | | |
|   PLP_ID | 6 | uimsbf |
|   max_CID | 8 | uimsbf |
|   adaptation_mode | 2 | uimsbf |
|   context_config | 2 | bslbf |
|   reserved | 6 | '111111' |
|   num_context | 8 | uimsbf |
|   for (i=0; i<num_context; i++) { | | |
|     context_id | 8 | uimsbf |
|     context_profile | 8 | uimsbf |
|     if (context_config == 1) { | | |
|       context_length | 8 | uimsbf |
|       static_chain_byte( ) | var | uimsbf |
|     } | | |
|     else if (context_config == 2) | | |
| { | | |
|       context_length | 8 | uimsbf |
|       dynamic_chain_byte( ) | var | uimsbf |
|     } | | |
|     else if (context_config == 3) | | |
| { | | |
|       context_length | 8 | uimsbf |
|       static_chain_byte( ) | var | uimsbf |
|       dynamic_chain_byte( ) | var | uimsbf |
|     } | | |
|   } | | |
| } | | |

Table 19 shows adaption mode values included in table 18.

TABLE 19

| adaptationmode | Meaning |
|---|---|
| 00 | Adaptation Mode 1 |
| 01 | Adaptation Mode 2 |
| 10 | Adaptation Mode 3 |
| 11 | Reserved |

Figure 3:
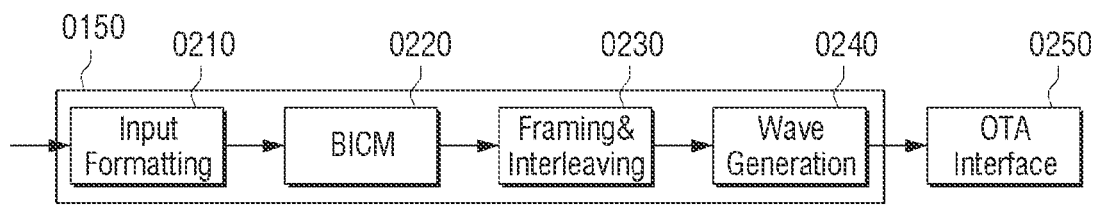
FIG. 3 is a view to illustrate a schematic configuration of a broadcast physical layer according to an embodiment of the disclosure.

FIG. 3 is a view to illustrate a schematic configuration of the broadcast physical layer according to an embodiment of the disclosure.

Referring to FIG. 3, the broadcast physical layer 0150 may include an input formatting block 0210, a BICM block 0220, a framing & interleaving block 0230, and a waveform generation block 0240.

An input to the input formatting block 0210 may be an output from the broadcast link layer 0140 shown in FIG. 1, and the output from the broadcast link layer 0150 may be an ATSC 3.0 link layer protocol (ALP) packet stream defined by the ATSC 3.0. In addition, an output from the waveform generation block 0240 may be delivered to an OTA interface 250. Herein, the OTA interface 250 may be, for example, an interface for delivering the output of the broadcast physical layer 0150 to a delivery tower. FIG. 3 illustrates a system having one PLP for convenience of explanation, but this should not be considered as limiting.

The input formatting block 0210 converts the output packet stream of the broadcast link layer having a variable length into physical layer packets having a predetermined length. Herein, the physical layer packet may include a header and a payload, and the length of the physical layer packet may be determined by a parameter of the BICM block 0220.

The header of the physical layer packet includes information for restoring the output packet stream of the broadcast link layer by using a physical layer packet stream received at a receiver. For example, the header of the physical layer packet may include boundary information of a broadcast link layer packet included in the payload.

The BICM block 0220 outputs signal values within a predetermined constellation (or signal constellation or constellation) based on the input of the physical layer packet stream. In this case, parity bits may be generated by applying forward direction error correction encoding in the unit of the physical layer packet. Thereafter, bits and parity bits of the physical layer packet are interleaved with each other, and are grouped in the unit of a predetermined number of bits and are mapped onto constellation signal values.

The framing & interleaving block 0230 generates an OFDM frame by using the signal values within the constellation, and delivers the generated OFDM frame to the waveform generation block 0240 to be converted into a transmissible signal. A part of the OFDM frame generated in the process of the operation of the framing & interleaving block 0230 may include control information which is generated through a separate path (not shown) from the BICM block 0220. Herein, the control information (hereinafter, referred to as LA signaling) may be transmitted via a specific OFDM symbol.

Figure 4:
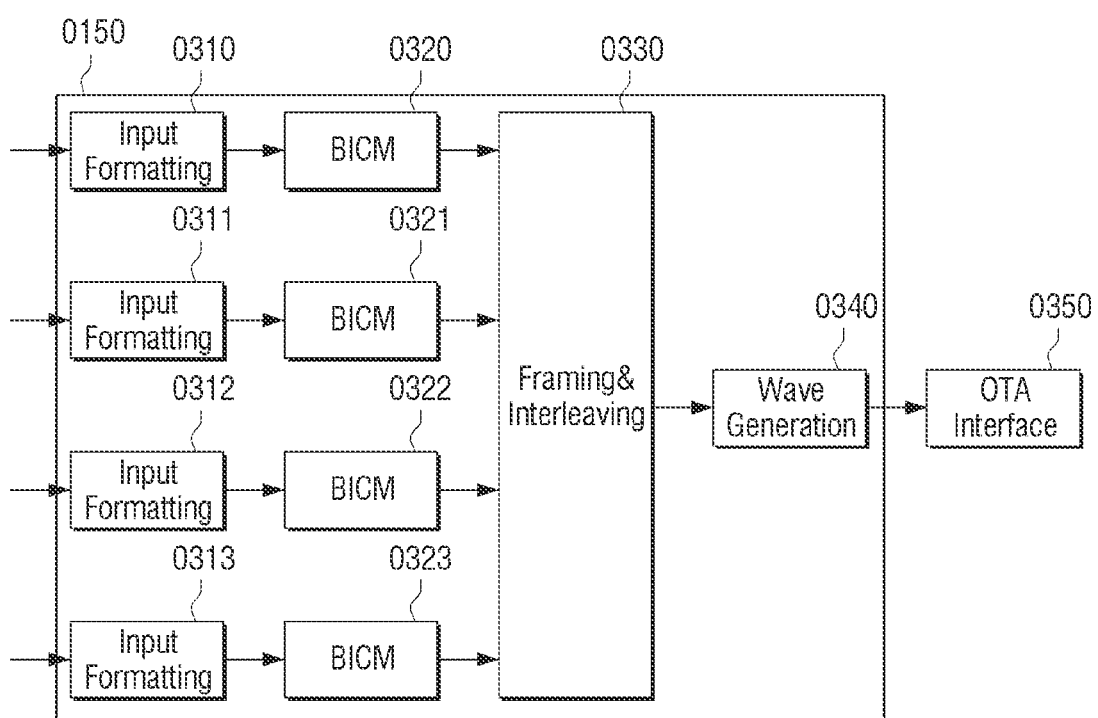
FIG. 4 is a view to illustrate a schematic configuration of a broadcast physical layer supporting a plurality of physical layer pipes (PLPs) according to an embodiment of the disclosure.

FIG. 4 is a view to illustrate a schematic configuration of the broadcast physical layer 0150 supporting a plurality of PLPs according to an embodiment of the disclosure.

As shown in FIG. 4, the broadcast physical layer according to an embodiment uses four signal processing paths, for example, four PLPs. The respective PLPs may be assigned unique input formatting blocks 0310, 0311, 0312, 0313 and BICM blocks 0320, 0321, 0322, 0323.

A framing & interleaving block 0230 of FIG. 4 generates an OFDM frame including four PLPs assigned signal values within the constellation outputted from the four BICM blocks 0320, 0321, 0322, 0323, and L1 signaling (control information). Herein, L1 signaling includes information necessary for a receiver to identify the signal values corresponding to the four PLPs. In addition, LLS packets including the above-described SLT may be transmitted through a PLP providing relatively high reliability, rather than through all PLPs, and L1 signaling includes information for identifying a PLP including an LLS packet. In this case, the above-described link layer signaling may also be transmitted through the PLP including the LLS packet.

Figure 5:
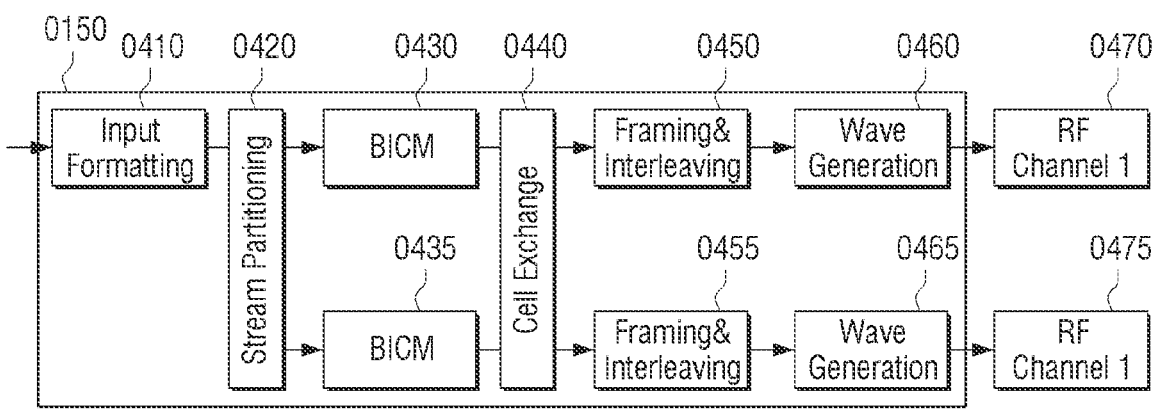
FIG. 5 is a view to illustrate a schematic configuration of a broadcast physical layer supporting channel bonding according to an embodiment of the disclosure.

FIG. 5 is a view to illustrate a schematic configuration of the broadcast physical layer supporting channel bonding according to an embodiment of the disclosure.

Referring to FIG. 5, data transmitted through a PLP to which channel bonding is to be applied is processed at one input formatting block 0410. A physical layer packet generated at the input formatting block 0410 may be divided at a streaming partitioning block 0420, and may be inputted to respective BICM blocks 0430, 0435.

The streaming partitioning block 0420 divides the physical layer packet equally for respective BICM blocks, or divides the physical layer packet according to a predetermined ratio. Signal values within the constellation outputted from the BICM blocks 0430, 0435 may be inputted to respective framing & interleaving blocks 0450, 0455 as they are, according to a channel bonding method, or may go through a signal processing process for increasing time/frequency diversity at a separate cell exchange block 0440 and may be inputted to the framing & interleaving blocks 0450, 0455. For example, a bonding method without using the cell exchange block 0440 is referred to as Plain channel bonding, and a method using the cell exchange block 0440 is referred to as Channel bonding with SNR averaging.

Thereafter, the signal go through the processing of the framing & interleaving blocks 0450, 0455 and the waveform generation blocks 0460, 0465 according to signal delivery paths, and are transmitted to two frequency bands 0470, 0475. When channel bonding is used, PLPs sharing the same input formatting block 0410 should use the same identifier value, and the receiver performs signal processing based on this. In addition, when channel bonding is used, information regarding whether channel bonding is used for each PLP and information regarding other bonded frequency band may be provided as L1 signaling.

In a digital broadcasting system according to an embodiment of the disclosure, one service may be transmitted through a plurality of frequency bands. In this case, information regarding the service may be transmitted through one frequency band or all of the plurality of frequency bands. In addition, the service may be configured to provide basic image and sound even when a receiver processes only data provided through one specific frequency band, or may be configured to provide an image and a sound only when the receiver processes all data provided through the plurality of frequency bands. The former service is referred to as an enhanced service, and the latter service is referred to as an integrated service. An example of the enhanced service may be a service which transmits a main image and sound information through one frequency band, and transmits a subsidiary image, a subsidiary sound, etc. through an additional frequency band. An example of the integrated service may be a service which transmits a high-quality media such as a 8K image which exceeds the limit of a channel capacity that can be transmitted by one frequency band. Hereinafter, a case in which one service is transmitted by using two frequency bands will be assumed for convenience of explanation.

The above-described SLT in the digital broadcasting system according to an embodiment of the disclosure may include information regarding a plurality of frequency bands as a subordinate element of the Service element. Table 20 presented below shows information regarding the plurality of frequency bands included in the SLT according to an embodiment.

TABLE 20

| MultiRFChannel | 0 ... 1 | | Multi-RF Channel Information |
|---|---|---|---|
| @isPrimaryBS | 1 | bool | Indicates whether one or more components needed for meaningful presentation of this service are protected (e.g. encrypted). |
| @PrimaryBsid | 0 ... 1 | unsignedshort | Identifier of the Primary Broadcast Stream. |
| @secondaryBsid | 0 ... N | unsignedshort | Identifier of the Secondary Broadcast Stream. |
| @MultiRFChannelType | 1 | unsignedByte | Indicates whether all components needed for meaningful presentation of this service are delivered by the Primary Broadcast Stream.. |

A "MultiRFChannel" element is a complex element that includes information regarding an RF channel used for a subordinate element and attributes to transmit the service. The corresponding element may be included in signaling only when the service is transmitted through more than one RF channels. When the corresponding element is not included in the signaling, the service may be transmitted by only one broadcast stream identified by @bsid of the SLT.

"@isPrimaryBS" is a Boolean attribute that indicates whether the broadcast stream transmitting the SLT is a primary stream (stream including an essential portion). When the corresponding attribute is "1" or "true," it may indicate that the stream transmitting the SLT is a primary broadcast stream. When the corresponding attribute is "0" or "false," it may indicate that the broadcast stream transmitting the SLT is one of secondary broadcast streams (streams including a non-essential portion).

"@PrimaryBsid" is an identifier of the primary broadcast stream. A value of the Primary Bsid may be a unique value in a region level. In this case, an administrative or a regulatory authority performs such a role. The corresponding attribute may exist only when the value of "@isPrimaryBS" is "0" or "false."

"@secondaryBsid" is an identifier of a secondary broadcast stream (stream including a non-essential portion). A value of the secondary Bsid may be a unique value in a region level. In this case, the administrative or the regulatory authority performs such a role. The corresponding attribute may exit only when the value of "@isPrimaryBS" is "0" or "false."

"@MultiRFChannelType" is an integer indicating use of the secondary broadcast stream, and may be expressed by 8 bits. The corresponding value according to an embodiment may be coded according to table 21 presented below.

TABLE 21

| MultiRFChannelType | Meaning |
| --- | --- |
| 0 | Reserved |
| 1 | Supplementary components |
| 2 | Plain channel bonding |
| 3 | Channel bonding with SNR averaging |
| Other values | Reserved for future use |

Figure 6:
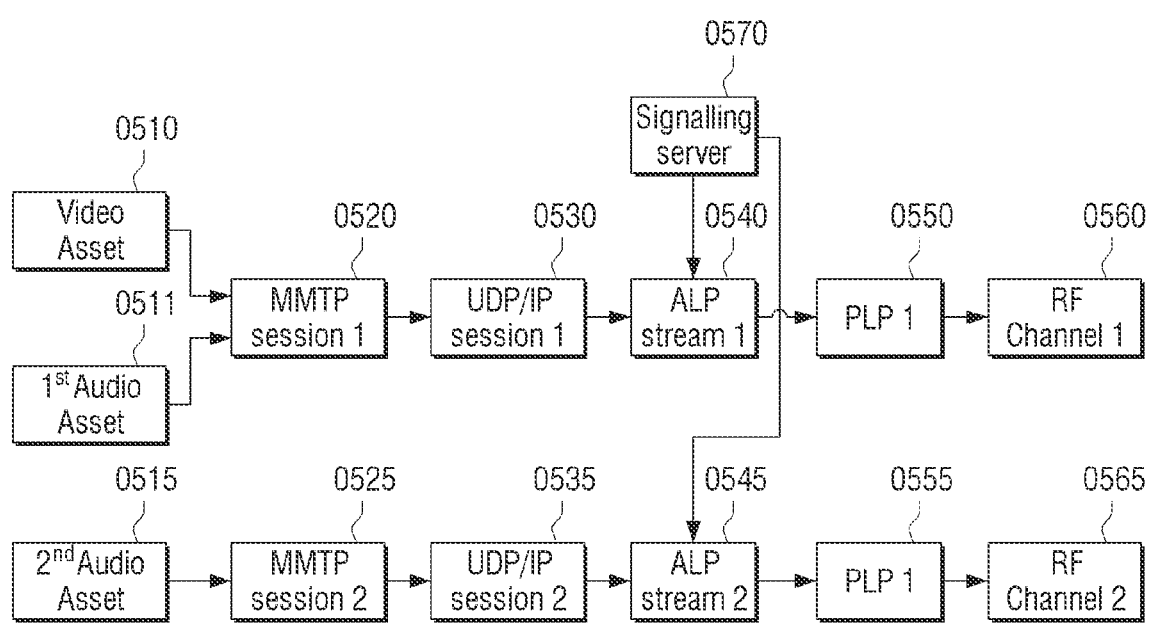
FIG. 6 is a view to illustrate a case in which an enhanced service is transmitted by using two frequency bands according to an embodiment of the disclosure.

FIG. 6 is a view to illustrate a case in which a service is transmitted by using two frequency bands according to an embodiment of the disclosure.

Referring to FIG. 6, one enhanced service according to an embodiment of the disclosure may include three assets in total including a video asset 0510, a 1" audio asset 0511, and a $2^{nd}$ audio asset 0515. The video asset 0510 and the $1^{st}$ audio asset 0511 of the three assets may be multiplexed to an MMTP session 1 0520, and the 2nd audio asset 0515 may be multiplexed to an MMTP session 2 0525. Thereafter, the MMTP session 1 0520 may be encapsulated to an UDP/IP session 1 0530 and an ALP stream 1 0540, and may be signal-processed to a PLP 1 0550 and may be transmitted to an RF channel 1 0560. Similarly, the MMTP session 2 0525 may be encapsulated to an UDP/IP session 2 0535 and an ALP stream 2 0545, and may be signal-processed to a PLP 1 0555 and may be transmitted to an RF channel 2 0560. Herein, the ALP streams may include LLS and link layer signaling provided from a signaling server 0570.

Hereinafter, for convenience of explanation, it is assumed that the RF channel 1 0560 of FIG. 6 is a primary broadcast stream having a bsid value of 1, and the RF channel 2 0565 is a secondary broadcast stream having a bside value of 2.

In an embodiment of the disclosure, the SLT may be transmitted only by the primary broadcast stream. Element attributes of MultiRFChannel of the SLT shown in table 21 have the following values. Herein, the @PrimaryBsid attribute may be omitted.
@isPrimaryBS='1'
@SecondaryBsid='2'
@MultiRFChannelType='1'

Based on the above-described values, a receiver may identify that the currently received service uses two frequency bands, and that the broadcast stream (bsid=1) through which the current SLT is received is the primary broadcast stream, and the bsid value of the secondary broadcast stream is "2." In addition, the receiver may identify that the secondary broadcast stream transmits only additional service components, and a basic service can be provided to a user only with the primary broadcast stream before the additional service components are additionally received.

As described above, only information of the IP upper layer regarding a transmission position of the media data in the upper layer signaling is included. In this case, an LMT which is link layer signaling is required to identify a PLP through which real data is transmitted. In the above-described embodiment, the receiver tunes in to the primary broadcast stream, and then signal-processes the PLP 1 and obtains the LMT which is link layer signaling and the SLT which is a kind of LLS. The LMT provides a mapping relationship between the UDP/IP session and the PLP which are used to transmit the enhanced service in the current frequency band. In the embodiment of FIG. 5, information indicating that the UDP/IP session 1 is transmitted to the PLP1 may be included.

In an embodiment of the disclosure, an identifier of the PLP through which LLS and link layer signaling for the enhanced service are transmitted in the primary broadcast stream, and an identifier of the PLP through which link layer signaling for the enhanced service is transmitted in the secondary broadcast stream may be the same value. In this case, the receiver tunes in to the primary broadcast stream, and then signal-processes the PLP 1 and obtains the LMT and the SLT. Next, it can be seen from the MultiRFChannel element of the LMT that additional components for the enhanced service are transmitted through the secondary broadcast stream of the bisd value of 2. Thereafter, the receiver tunes in to the secondary broadcast stream of the bside value of 2, and then signal-processes the PLP 1 and obtains the LMT, and provides the mapping relationship between the UDP/IP session and the PLP which are used to transmit the enhanced service. In the embodiment of FIG. 6, information indicating that the UDP/IP session 2 is transmitted to the PLP 1 may be included.

According to another embodiment of the disclosure, the LMT may further include a mapping relationship between an UDP/IP session and a PLP which are transmitted through other frequency bands, in addition to the current frequency band. In this case, the receiver may tune in to the secondary broadcast stream, and may not process the PLP through which the LMT is transmitted and may directly process the PLP through which the media data is transmitted.

According to an embodiment of the disclosure, the SLT including the information regarding the service may be transmitted through both the primary broadcast stream and the secondary broadcast stream. In this case, the enhanced service in the SLT transmitted through the two broadcast streams has the same @ServiceId value, and the attributes of the MultiRFChannel element shown in table 21, in the SLT transmitted through the primary broadcast stream, have the following values. Herein, the @PrimaryBsid attribute may be omitted.
@isPrimaryBS='1'
@SecondaryBsid='2'
@MultiRFChannelType='1'

In addition, the attributes of the MultiRFChannel element shown in table 21, in the SLT transmitted through the secondary broadcast stream, have the following values. Herein, the @SecondaryBsid attribute may be omitted.
@isPrimaryBS='0'
@PrimaryBsid='1'
@MultiRFChannelType='1'

By using the above-described values, the receiver may identify that the current service uses two frequency bands, and the broadcast stream (bsid='1') through which the current SLT is received is the primary broadcast stream and the bsid value of the secondary broadcast stream is '2.' In addition, the receiver may identify that the secondary broadcast stream transmits only additional service components, and a basic service can be provided to the user only with the primary broadcast stream before the additional service components are additionally received.

According to an embodiment of the disclosure, the information regarding the enhanced service in the SLT transmitted through the two broadcast streams may have the same values except for @bsid and MultiRFChannel. In another embodiment of the disclosure, the SLT transmitted through the secondary broadcast stream may omit the BroadcastSvcSignaling element. In this case, the receiver may obtain a transmission position of the service signaling in the SLT transmitted through the primary broadcast stream.

Figure 7:
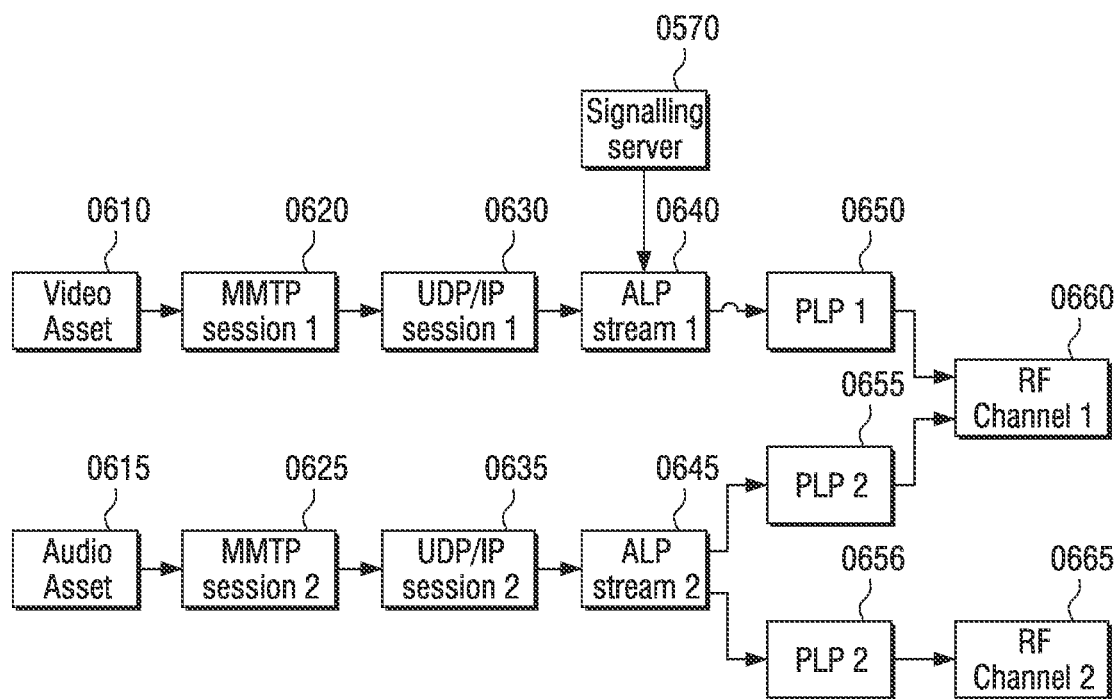
FIG. 7 is a view to illustrate a case in which an integrated service is transmitted by using two frequency bands according to an embodiment of the disclosure.

FIG. 7 is a view to illustrate a case in which an integrated service is transmitted by using two frequency bands according to an embodiment of the disclosure.

Referring to FIG. 7, one integrated service according to an embodiment of the disclosure may include two assets in total including an audio asset 0610 and a video asset 0615. The audio asset 0610 of the two assets may be multiplexed to an MMTP session 1 0620, and the video asset 0615 may be multiplexed to an MMTP session 2 0625. Thereafter, the MMTP session 1 0620 may be encapsulated to an UDP/IP session 1 0630 and an ALP stream 1 0640, and may be signal-processed to a PLP 1 0650 and may be transmitted to an RF channel 1 0560. The MMTP session 2 0625 may be encapsulated to an UDP/IP session 2 0635 and an ALP stream 2 0645, and may be signal-processed to a PLP 2 0655 of the RF channel 1 0660 and a PLP 2 0656 of an RF channel 2 0665, and may be transmitted to the RF channel 2 0665. In addition, the ALP stream 1 0640 may include LLS and link layer signaling, and the LLS and the link layer signaling may be generated at a signaling server 0570. The RF channel 2 0665 may include another PLP in addition to the PLP 2 0656 although it is not illustrated in FIG. 7, and the LLS and the link layer signaling may be transmitted through this PLP.

Hereinafter, for convenience of explanation, it is assumed that the RF channel 1 0660 of FIG. 7 is a primary broadcast stream having a bsid value of 1, and the RF channel 2 0665 is a secondary broadcast stream having a bsid value of 2.

According to an embodiment of the disclosure, the SLT may be transmitted only through the primary broadcast stream. The attributes of the MultiRFChannel elements in the SLT, shown in table 19, has the following values. In this case, the @PrimaryBsid attribute may be omitted.

@isPrimaryBS='1'
@SecondaryBsid='2'
@MultiRFChannelType='2' or '3'

By using the above-described values, the receiver may identify that the current service uses two frequency bands, the broadcast stream (bsid='1') through which the current SLT is received is the primary broadcast stream, the bsid value of the secondary broadcast stream is '2,' and all of the signals transmitted through the two frequency bands should be processed to provide the service.

According to an embodiment, when a value of @MultiRFChannelType indicates an integrated service, the other attributes except for @MultiRFChannelType may be omitted from the MultiRFChannel element shown in table 21.

In the digital broadcasting system according to an embodiment of the disclosure, information for utilizing a plurality of frequencies may be delivered only by using the SLT. In this case, at least one of the MultiRFChannel element shown in table 20 described above and the MultiRFChannel element shown in table 22 presented below may be used.

The "MultiRFChannel" element is a complex element that includes information regarding an RF channel used for a subordinate element and attributes to transmit the service. The corresponding element may be included in signaling only when the service is transmitted by more than one RF channels. When the corresponding element is not included in the signaling, the service may be transmitted by only one broadcast stream identified by @bsid of the SLT.

"@isPrimaryBS" is a Boolean attribute that indicates whether the broadcast stream transmitting the SLT is a primary stream (stream including an essential portion). When the corresponding attribute is "1" or "true," it may indicate that the stream transmitting the SLT is a primary broadcast stream. When the corresponding attribute is "0" or "false," it may indicate that the broadcast stream transmitting the SLT is one of secondary broadcast streams (streams including a non-essential portion).

"@PrimaryBsid" is an identifier of the primary broadcast stream. A value of the Primary Bsid may be a unique value in a region level. In this case, an administrative or a regulatory authority performs such a role. The corresponding attribute may exist only when the value of "@isPrimaryBS" is "0" or "false." When the corresponding attribute does not exist, reference may be made to the @bside attribute value of the SLT.

"@associatedBsid" is an identifier of a broadcast stream related to the broadcast stream identified by the SLT@bsid, except for the primary broadcast stream. A value of associatedBsid may be a unique value in a region level. In this case, the administrative or the regulatory authority may perform such a role.

"@MultiRFChannelType" is an integer indicating use of a plurality of broadcast streams, and may be expressed by 8 bits. The corresponding value according to an embodiment may be coded according to table 23 presented below. When the corresponding attribute does not exist, reference may be made to "1" as the corresponding value.

TABLE 23

| MultiRFServiceType | Meaning |
| --- | --- |
| 0 | Reserved |
| 1 | Supplementary (all components needed for meaning presentation of this service are delivered by the primary Broadcast Stream.) |
| 2 | Integral (one or more components needed for meaning presentation of this service are not delivered by the primary Broadcast Stream. |
| Other values | Reserved for future use |

"MultiRFProcessingType" in table 23 is an integer indicating a method for processing a plurality of broadcast streams, and may be expressed by 8 bits. The corresponding

TABLE 22

| | | | |
| --- | --- | --- | --- |
| MultiRFChannel | 0 . . . 1 | | Multi-RF Channel Information |
| @isPrimaryBS | 1 | bool | Indicates whether one or more components needed for meaningful presentation of this service are protected (e.g. encrypted). |
| @PrimaryBsid | 0 . . . 1 | unsignedshort | Identifier of the Primary Broadcast Stream. |
| @associatedBsid | 0 . . . N | unsignedshort | Identifiers of the associated Broadcast Streams. |
| @MultiRFUsageType | 0 . . . 1 | unsignedByte | Indicates whether all components needed for meaningful presentation of this service are delivered by the Primary Broadcast Stream. |
| @MultiRFProcessingType | 0 . . . 1 | unsignedByte | Indicates the processing type of multiple Broadcast Streams. | value may be coded according to table 24 presented below. When the corresponding attribute does not exist, reference may be made to "1" as the corresponding value.

TABLE 24

| MultiRFProcessingType | Meaning |
|---|---|
| 0 | Reserved |
| 1 | Independent |
| 2 | Plain channel bonding |
| 3 | Channel bonding with SNR averaging |
| Other values | Reserved for future use |

In the above-described embodiment, the multiRFChannel element is a child element of the Service element, and may provide only information regarding a service identified by the parent Service element. According to an implementation example, MultiRFChannel providing information regarding all services included in the SLT may be provided. In this case, when all of the MultiRFChannel regarding the SLT and the MultiRFChannel element regarding the service exist, the MultiRFChannel element regarding the service may have a priority. In addition, the MultiRFChannel element shown in table 23 separately provides @primaryBsid, but, according to an implementation example, bsid regarding the primary broadcast stream may be provided as the first @associatedBsid.

"@associatedBsid" is an identifier of a broadcast stream related to the broadcast stream identified by the SLT@bsid. An associatedBsid value may be a unique value in a region level. In this case, an administrative or regulatory authority may perform such a role. When a value of @isPrimaryBS is "0" or "false," the first stance value of the corresponding attribute may be referred to as the identifier of the primary broadcast stream.

In a digital broadcasting system according to another embodiment of the disclosure, information for utilizing a plurality of frequencies may be delivered by using both the SLT and the service layer signaling. In this case, the above-described MultiRFChannel element may be used for the SLT. An identifier of a broadcast stream through which each media data is transmitted may be delivered as a portion of signaling indicating an upper level transmission path of media data. For example, in the case of the MMT, bsid_descriptor of table 7 described above may be delivered to asset_descriptor of table 3 described above. In another example in the case of the MMT, bsid_descriptor as shown in table 8 described above or tables 25 and 26 presented below may be provided to mmt_atsc3_message( ) payload of table 10 described above.

TABLE 25

| Syntax | Value | No. of bits | Mnemonic |
|---|---|---|---|
| bsid_descriptor( ) { | | | |
|   descriptor_tag | | 16 | uimsbf |
|   descriptor_length | | 16 | uimsbf |
|   num_bsid | N1 | 8 | uimsbf |
|   for ( i = 0 ; i < N1 ; i-+ ) { | | | |
|     bsid | | 16 | uimsbf |
|     num_asset | N2 | 8 | uimsbf |
|     for ( j = 0 ; j < N2 ; j+− ) { | | | |
|       asset_id_length | N3 | 8 | uimsbf |
|       for ( k = 0 ; k < N3 ; k-- ) { | | | |
|         asset_id_byte | | 8 | uimsbf |
|       } | | | |
|     } | | | |
|   } | | | |
| } | | | |

Herein, "num_bsid" indicates the number of broadcast streams, "bsid" indicates identifier of the broadcast stream, "num_of_asset" indicates the number of assets transmitted by a broadcast stream identified by bsid, "asset_id_length" indicates a byte length of a video asset id, and "asset_id_byte" may include a byte of an asset id.

TABLE 26

| Syntax | Value | No. of bits | Mnemonic |
|---|---|---|---|
| bsid_descriptor( ) { | | | |
|   descriptor_tag | | 16 | uimsbf |
|   descriptor_length | | 16 | uimsbf |
|   num_bsid | N1 | 8 | uimsbf |
|   for ( i = 0 ; i < N1 ; i++ ) { | | | |
|     bsid | | 16 | uimsbf |
|     num_IP_flows | N2 | 8 | uimsbf |
|     for( j = 0 ; j < N2 ; j++ ) { | | | |
|       ipv4_src_addr | | 32 | uimsbf |
|       ipv4_dst_addr | | 32 | uimsbf |
|       dst_port | | 16 | uimsbf |
|       packet_id | | 16 | uimsbf |
|     } | | | |
|   } | | | |
| } | | | |

Herein, "num_bsid" indicates the number of broadcast streams, and "bsid" indicates tlrud of the broadcast stream, and "num_IP_flows" is an 8-bit unsigned integer field for identifying the number of MMTP sub-flows transmitted by a broadcast stream identified by the bsid field. In addition, "ipv4_src_addr" is a 32-bit unsigned integer field indicating an IP version 4 source address of the MMTP sub-flow, and "ipv4_dst_addr" is a 32-bit unsigned integer field indicating an IP version 4 destination address of the MMTP sub-flow. "dst_port" is a 16-bit unsigned integer field indicating an MMP sub flow destination port number, and "packet_id" is a 16-bit unsinged integer field indicating packet identifier in MMP packet header transmitted by the MMTP sub-flow. Herein, the packet_id field may be omitted or selectively provided.

In the case of MMT, an asset id regarding each asset, and an address of an MMTP session to which the corresponding asset is transmitted, and packet_id are delivered to an MP table. When bsid_descriptor is delivered to the above-described mmt_atsc3_message( ), the receiver may know which asset is transmitted through which broadcast stream by using the asset id of table 26, and may know which MMTP session and packet_id the MMTP packets have and which broadcast stream is used to transmit, by combining information in the above-described MP table.

In the case of ROUTE, as an attribute of the RS element, a @bsid attribute for identifying a broadcast stream through which the corresponding ROUTE session is transmitted may be provided in the S-TSID as shown in table 13.

In a digital broadcasting system according to still another embodiment of the disclosure, information for utilizing a plurality of frequencies may be delivered by using only service layer signaling. In this case, the above-described MultiRFChannel element may be included in the bundleDescriptionMMt or the bundleDescriptionROUTE of table 1 or table 2. In addition, as in the above-described embodiment, an identifier of a broadcast stream through which each media data is transmitted may be delivered as a portion of signaling indicating an upper level transmission path of the media data.

In a digital broadcasting system according to yet another embodiment of the disclosure, information for utilizing a plurality of frequencies may be transmitted as a portion of signaling indicating an upper level transmission path of media data. In this case, information included in the above-described multiRFChannel may be transmitted along with an identifier of a broadcast stream through which each media data is transmitted. For example, with a bsid, a flag indicating whether the broadcast stream identified by the corresponding bsid is primary, or a field (or information) indicating whether the broadcast stream identified by the corresponding bsid is independently processable may be added to bsid_descriptor of table 26 or 27.

Figure 8:
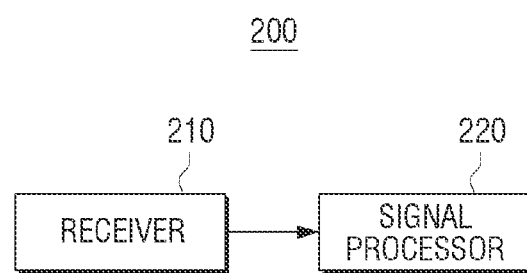
FIG. 8 is a block diagram illustrating a configuration of a reception device according to an embodiment of the disclosure.

FIG. 8 is a block diagram illustrating a configuration of a reception device according to an embodiment of the disclosure.

Referring to FIG. 8, the reception device 200 includes a receiver 210 and a signal processor 220.

The receiver 210 may receive a broadcast signal from the transmission device 100. The receiver 210 may include at least one reception antenna (not shown).

The receiver 210 may receive a broadcast stream through an RF channel.

The signal processor 220 signal-processes the broadcast stream received through the RF channel, and obtains a service to be provided to a user. Herein, the service may be configured to provide basic image and sound even when the reception device 200 processes only data provided through one specific RF channel, or may be configured to provide an image and a sound only when the reception device 200 processes all of data provided through a plurality of RF channels.

In order for the reception device 200 to know what application layer protocol is used to transmit a specific service, the transmission device 100 should inform of information regarding an application protocol for transmitting the service through signaling independent from the application layer protocol. Herein, the signaling may be various types of signaling described above in FIGS. 1 to 7. For example, the service list table (SLT) according to an embodiment includes information regarding the service in the form of a table as the signaling for informing the reception device 200 of information of the application protocol.

Herein, the signaling for the service may include information indicating whether the service is transmitted through a plurality of RF channels, and information indicating whether the broadcast stream transmitted through the RF channel includes an essential portion of the service.

For example, when the signaling for the service includes a first attribute, it may indicate that the service is transmitted through a plurality of RF channels.

In addition, when an attribute value of the first attribute is a first value, it may indicate that the broadcast stream includes the essential portion of the service, and, when the attribute value of the first attribute is a second value, it may indicate that the broadcast stream includes a non-essential portion of the service. Herein, the first attribute may be a Boolean attribute, and the first value may be "true" and the second value may be "false.

In addition, when the attribute value of the first attribute is the first value, the signaling for the service may further include information regarding an identifier of a broadcast stream transmitting the non-essential portion of the service.

In addition, the signaling for the service may further include information indicating whether the broadcast stream transmits a duplicate or a portion of the service.

Since a variety of information regarding the service included in the service signaling (for example, the SLT) has been described above, a detailed description thereof is omitted.

The variety of information regarding the service included in the SLT enables portions or duplicates of the service transmitted through the plurality of RF channels to be integrated into one service on a channel map of the reception device 200 when channels are scanned. An SLT entry of the essential portion or duplicate may include broadcast stream identifiers (BSIDs) of broadcast streams that can be found by the other portions or duplicates.

For example, the reception device 200 may tune in to a primary broadcast stream including an essential portion, and then may signal-process PLP 1 and obtain the SLT. Next, the reception device 200 may know that the other portions for the enhanced service are transmitted through a secondary broadcast stream identified by a specific otherbisd value, based on information included in the SLT. Thereafter, the reception device 200 may tune in to the secondary broadcast stream and then may signal-process PLP 1.

Although not mentioned in detail in FIG. 8, elements related to the reception device from among the elements described in FIGS. 1 to 7 may be applied to the reception device 200 of FIG. 8.

According to various embodiments of the disclosure as described above, one service is transmitted by using a plurality of frequency bands, such that broadcast frequency resources can be efficiently used. In addition, although the use of two frequency bands has been mainly described in the above-described embodiments, it is obvious that the main features of the disclosure are applicable even when the number of used frequency bands increases.

Specific aspects of the disclosure may be implemented as a computer readable code in a computer readable recording medium. The computer readable recording medium may be a certain data storage device that can store data readable by a computer system. Examples of the computer readable recording medium may include a read only memory (ROM), a random access memory (RAM), a CD-ROM, a magnetic tape, a floppy disk, an optical data storage device, and a carrier wave (data transmission through the Internet). The computer readable recording medium may be distributed through computer systems connected through a network, and accordingly, the computer readable code is stored and executed in a distributed method. In addition, functional programs, codes, and code segments for achieving the disclosure may be easily interpreted by skilled programmers in the field to which the present application is applied.

In addition, it can be seen that the device and the method according to an embodiment of the disclosure may be executed in the form of hardware, software, or a combination of hardware and software. Such certain software may be stored in a volatile or nonvolatile storage device such as a storage device such as a ROM, etc., a memory such as a RAM, a memory chip, a device or integrated circuit, or a storage medium which can optically or magnetically record, and simultaneously, can be read by a machine (for example, a computer), such as a CD, a DVD, a magnetic disk or a magnetic tape, regardless of whether the software can be deleted or re-recorded. The method according to an embodiment of the disclosure may be implemented by a computer or a portable terminal including a controller and a memory, and the memory may be a program including instructions for implementing embodiments of the disclosure, or an example of a machine-readable storage medium suitable to store the programs.

Accordingly, the disclosure includes a program including a code for implementing the device or method described in a certain claim of the present specification, and a machine (computer)-readable storage medium storing such a program. In addition, the program may be electronically transferred through a certain medium such as a communication signal transmitted through wired or wireless connection, and the disclosure appropriately includes an equivalent thereto.

In addition, the device according to an embodiment of the disclosure may receive a program from a program providing device connected wiredly or wirelessly, and may store the program. The program providing device may include a program including instructions for a program processing device to perform a predetermined transmission/reception method, a memory for storing information necessary for the transmission/reception method, a communication unit for performing wired or wireless communication with a graphic processing device, and a controller to transmit a corresponding program to a transmission and reception device according to a request of the graphic processing device or automatically.

While specific embodiments have been described in the detailed description of the disclosure, various changes can be made without departing from the scope of the disclosure. Therefore, the scope of the disclosure should not be limited to the embodiments described above, and should be defined by the appended claims and equivalents to the scope of the claims.

What is claimed is:

1. A transmission apparatus comprising:
   a communicator; and
   a processor configured to:
      generate broadcast signals, each of the broadcast signals comprising a service formed of media data, wherein each of the broadcast signals reproduces the service; and
      control the communicator to transmit a broadcast stream by transmitting the broadcast signals through respective radio frequency (RF) channels,
   wherein each of the broadcast signals comprises signaling for the service,
   wherein the signaling for the service comprises information indicating whether the service comprises more than one portion delivered via more than one RF channel, and attribute information indicating whether the broadcast stream delivered through the more than one RF channel comprises an essential portion of the service,
   wherein when the attribute information comprises a first value, the signaling for the service further comprises information regarding an identifier of another broadcast stream delivering a non-essential portion of the service, and
   wherein the first value indicates that the broadcast stream comprises the essential portion of the service.

2. The transmission apparatus of claim 1, wherein when the signaling for the service comprises the attribute information, the signaling indicates that the service is transmitted through the more than one RF channel.

3. The transmission apparatus of claim 1, wherein a second value included in the attribute information indicates that the broadcast stream comprises the non-essential portion of the service.

4. The transmission apparatus of claim 1, wherein the attribute information is a Boolean attribute that indicates either the first value of "true" or a second value of "false."

5. The transmission apparatus of claim 1, wherein the signaling for the service further comprises information indicating whether the broadcast stream transmits a duplicate or a portion of the service.

6. The transmission apparatus of claim 1, wherein the signaling for the service is a service list table (SLT).

7. A receiving apparatus comprising:
   a receiver configured to receive a broadcast stream comprising broadcast signals transmitted through respective radio frequency (RF) channels, each of the broadcast signals comprising a service formed of media data, wherein each of the broadcast signals reproduces the service; and
   a processor configured to process the broadcast signals of the received broadcast stream,
   wherein each of the broadcast signals comprises signaling for the service,
   wherein the signaling for the service comprises information indicating whether the service comprises more than one portion delivered via more than one RF channel, and attribute information indicating whether the broadcast stream delivered through the more than one RF channel comprises an essential portion of the service,
   wherein when the attribute information comprises a first value, the signaling for the service further comprises information regarding an identifier of another broadcast stream delivering a non-essential portion of the service, and
   wherein the first value indicates that the broadcast stream comprises the essential portion of the service.

8. The receiving apparatus of claim 7, wherein when the signaling for the service comprises the attribute information, the signaling indicates that the service is transmitted through the more than one RF channel.

9. The receiving apparatus of claim 7, wherein a second value included in the attribute information indicates that the broadcast stream comprises the non-essential portion of the service.

10. The receiving apparatus of claim 7, wherein the attribute information is a Boolean attribute that indicates either the first value of "true" or a second value of "false."

11. The receiving apparatus of claim 7, wherein the signaling for the service is a service list table (SLT).

* * * * *